(12) United States Patent
Bergenlid et al.

(10) Patent No.: US 12,348,469 B2
(45) Date of Patent: Jul. 1, 2025

(54) ASSISTANCE DURING AUDIO AND VIDEO CALLS

(71) Applicant: Google LLC, Mountain View, CA (US)

(72) Inventors: Fredrik Bergenlid, Mountain View, CA (US); Vladyslav Lysychkin, Zurich (CH); Denis Burakov, Zurich (CH); Behshad Behzadi, Mountain View, CA (US); Andrea Terwisscha Van Scheltinga, Zurich (CH); Quentin Lascombes De Laroussilhe, Zurich (CH); Mikhail Golikov, Mountain View, CA (US); Koa Metter, Mountain View, CA (US); Ibrahim Badr, Mountain View, CA (US); Zaheed Sabur, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/670,389

(22) Filed: May 21, 2024

(65) Prior Publication Data
US 2024/0314094 A1    Sep. 19, 2024

Related U.S. Application Data

(63) Continuation of application No. 18/215,221, filed on Jun. 28, 2023, now Pat. No. 12,028,302, which is a
(Continued)

(51) Int. Cl.
*H04L 51/10* (2022.01)
*G06F 16/44* (2019.01)
(Continued)

(52) U.S. Cl.
CPC ............. *H04L 51/10* (2013.01); *G06F 16/44* (2019.01); *G10L 15/22* (2013.01); *H04N 7/15* (2013.01);
(Continued)

(58) Field of Classification Search
None
See application file for complete search history.

(56) References Cited

U.S. PATENT DOCUMENTS 8,996,635 B1   3/2015  Byttow et al.
9,462,112 B2  10/2016  Woolsey et al.
(Continued)

OTHER PUBLICATIONS

International Bureau of WIPO, International Preliminary Report on Patentability for International Patent Application No. PCT/US2018/027639, Feb. 4, 2020, 6 pages.
(Continued)

*Primary Examiner* — Angela Nguyen
(74) *Attorney, Agent, or Firm* — IP Spring

(57) ABSTRACT

Implementations relate to providing information items for display during a communication session. In some implementations, a computer-implemented method includes receiving, during a communication session between a first computing device and a second computing device, first media content from the communication session. The method further includes determining a first information item for display in the communication session based at least in part on the first media content. The method further includes sending a first command to at least one of the first computing device and the second computing device to display the first information item.

20 Claims, 12 Drawing Sheets

Related U.S. Application Data continuation of application No. 17/991,300, filed on Nov. 21, 2022, now Pat. No. 11,765,113, which is a continuation of application No. 17/031,416, filed on Sep. 24, 2020, now Pat. No. 11,509,616, which is a continuation of application No. 15/953,266, filed on Apr. 13, 2018, now Pat. No. 10,791,078.

(60) Provisional application No. 62/538,764, filed on Jul. 30, 2017.

(51) Int. Cl.

| | |
|---|---|
| *G10L 15/22* | (2006.01) |
| *H04N 7/15* | (2006.01) |
| *H04N 21/439* | (2011.01) |
| *H04N 21/4788* | (2011.01) |
| *G10L 15/00* | (2013.01) |
| *G10L 15/16* | (2006.01) |
| *G10L 25/63* | (2013.01) |

(52) U.S. Cl.
CPC ..... *H04N 21/4394* (2013.01); *H04N 21/4788* (2013.01); *G10L 15/005* (2013.01); *G10L 15/16* (2013.01); *G10L 2015/223* (2013.01); *G10L 25/63* (2013.01)

(56) References Cited

U.S. PATENT DOCUMENTS

| | | | |
|---|---|---|---|
| 9,576,270 B1 | 2/2017 | Afshar et al. | |
| 10,075,676 B2 | 9/2018 | Segal | |
| 2005/0078613 A1* | 4/2005 | Covell | H04L 65/1101 370/260 |
| 2006/0172749 A1 | 8/2006 | Sweeney | |
| 2008/0092158 A1 | 4/2008 | Bhatnagar et al. | |
| 2008/0297588 A1 | 12/2008 | Kurtz et al. | |
| 2012/0192087 A1* | 7/2012 | Lemmey | H04L 65/80 715/753 |
| 2013/0321390 A1* | 12/2013 | Latta | G06T 19/006 704/E21.001 |
| 2014/0164532 A1 | 6/2014 | Lynch et al. | |
| 2014/0267543 A1 | 9/2014 | Kerger et al. | |
| 2015/0088514 A1 | 3/2015 | Typrin | |
| 2018/0129385 A1 | 5/2018 | Blumenfeld et al. | |
| 2020/0286130 A1 | 9/2020 | Betan et al. | |
| 2021/0385299 A1* | 12/2021 | Liao | A63F 13/211 |

OTHER PUBLICATIONS

USPTO, Notice of Allowance for U.S. Appl. No. 18/215,221, Feb. 22, 2024, 10 pages.
USPTO, Notice of Allowance for U.S. Appl. No. 17/031,416, Jul. 25, 2022, 10 pages.
USPTO, Notice of Allowance for U.S. Appl. No. 15/953,266, Jun. 1, 2020, 5 pages.
USPTO, Notice of Allowance for U.S. Appl. No. 17/991,300, Mar. 29, 2023, 10 pages.
USPTO, Non-final Office Action for U.S. Appl. No. 15/953,266, Nov. 21, 2019, 11 pages.
WIPO, "Written Opinion and International Search report in International Application No. PCT/US2018/027639", Jun. 4, 2018, 8 pages.

* cited by examiner

ASSISTANCE DURING AUDIO AND VIDEO CALLS

CROSS-REFERENCE TO RELATED APPLICATIONS

The present application is a continuation of U.S. patent application Ser. No. 18/215,221, filed Jun. 28, 2023 and titled ASSISTANCE DURING AUDIO AND VIDEO CALLS, which is a continuation of U.S. patent application Ser. No. 17/991,300, filed Nov. 21, 2022 and titled ASSISTANCE DURING AUDIO AND VIDEO CALLS (now U.S. Pat. No. 11,765,113), which is a continuation of U.S. patent application Ser. No. 17/031,416, filed Sep. 24, 2020 and titled ASSISTANCE DURING AUDIO AND VIDEO CALLS (now U.S. Pat. No. 11,509,616), which is a continuation of U.S. patent application Ser. No. 15/953,266, filed Apr. 13, 2018 and titled ASSISTANCE DURING AUDIO AND VIDEO CALLS (now U.S. Pat. No. 10,791,078), which claims priority to U.S. Provisional Patent Application No. 62/538,764, filed Jul. 30, 2017 and titled ASSISTANT DURING AUDIO AND VIDEO CALLS, the contents of all of which are incorporated herein by reference in their entirety.

BACKGROUND

Communication sessions using computing devices, e.g., one-to-one audio and video calls, audio conferences, video conferences, text messaging, etc. are popular. Users engage in communication sessions for a variety of purposes, e.g., to communicate with friends and family, to conduct business meetings, to share images, audio, video, computer files, etc. Communication sessions using computing devices enable users located in different geographic locations to easily communicate with each other.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations can include a computer-implemented method. The method can include receiving, during a communication session between a first computing device and a second computing device, first media content from the communication session. The method can also include based at least in part on the first media content, determining a first information item for display in the communication session. The method can further include sending a first command to at least one of the first computing device and the second computing device to display the first information item.

Receiving the first media content from the communication session can include receiving respective media content from the first computing device and from the second computing device. The method can also include receiving second media content from the communication session, the second media content can be generated in the communication session subsequent to the first media content, and, based at least in part on the second media content, determining a second information item for the communication sessions. The method can further include sending a second command to the first computing device and the second computing device to display the second information item.

The communication session can include a synchronous communication session, and receiving the first media content can include receiving at least one of: audio, video, and text from the communication session. The method can also include sending the first information item to at least one of the first computing device and the second computing device. Determining the first information item can be based on contextual information.

The method can further include sending a request for the contextual information to at least one of the first computing device and the second computing device, and receiving the contextual information. The first command can be configured to cause display of a user interface that includes the first information item. The communication session can include video that includes a face, and the first command can cause display of the user interface such that the face is not obscured.

The first information item can be associated with a first user of the first computing device, and the first command can be sent to the first computing device and not sent to the second computing device. The first command can be configured to cause display of a user interface that a selectable user interface element that enables the first user to provide permission to share the first information item in the communication session. The method can also include receiving, from the first computing device, an indication that the first user has provided the permission to share the first information item, and, in response to receiving the indication, sending a third command to the second computing device to display the second information item.

The method can be implemented by a third computing device distinct from the first computing device and the second computing device, and the communication session can include audio and video exchanged between the first computing device and the second computing device. Receiving the first media content can include receiving the audio.

The method can be implemented by an assistant application on the first computing device, and the method can further include providing a visual indicator that the assistant application is active. The method can further include receiving, during the communication session, a user command to disable the assistant application, and, in response to the user command, disabling the assistant application. The assistant application can be part of an application program executing on the first computing device that provides the communication session.

The method can also include sending a permission command to the first computing device and the second computing device, the permission command configured to cause display of a permission user interface that enables a first user of the first computing device and a second user of the second computing device to provide respective permission indications, prior to receiving the first media content from the communication session. The method can further include receiving the respective permission indications, and determining whether each of the respective permission indications include a user permission to receive the first media content. Receiving the first media content from the communication session may not be performed if at least one of the respective permission indications do not include the user permission.

The method can also include detecting whether first media content includes an invocation phrase. The determining and the sending can be performed if it is determined the first media content includes the invocation phrase.

Receiving the first media content can include receiving a locally-generated representation of user activity within the communication session from the first computing device and the second computing device. The locally-generated representation can be based on at least one of: audio, video, and text transmitted by the respective computing device during the communication session.

The communication session can include video that includes a face, and the first command can cause display of a user interface at a particular position relative to the face. The method can be implemented by a third computing device that participates in the communication session, the third computing device distinct from the first computing device and the second computing device. The method can also include receiving, during the communication session, a user command to disconnect from the communication session, and in response to the user command, removing the third computing device from the communication session.

The first information item can include at least one of audio and video, and the first command can be configured to cause playback of at least one of the audio and the video. The first information item can correspond to an interactive application, and the first command can be configured to cause display of an interactive user interface of the interactive application. First media content can include audio from the communication session, and the first information item can include at least one of: a text transcript of the audio, and a translation of the audio. First media content can include video from the communication session, and the first information item can be determined based on recognizing an object in the video.

Some implementations can include a non-transitory computer readable medium with instructions stored thereon that, when executed by a hardware processor, cause the hardware processor to perform operations. The operations can include receiving, during a communication session between a first computing device and a second computing device, first media content from the communication session; for example, from the first computing device. The operations can further include receiving, during the communication session, second media content from the computing device, and determining a first information item for display in the communication session, based at least in part on the first media content and the second media content. The operations can also include sending a first command to the first computing device and the second computing device to display the first information item.

The second media content can be received subsequent to the first media content. The first command can be configured to cause display of a user interface that includes the first information item on the first computing device and the second computing device.

Some implementations can include a system comprising a hardware processor, and a memory coupled to the hardware processor with instructions stored thereon that, when executed by the hardware processor, cause the hardware processor to perform operations.

The operations can include receiving, during a communication session between a first computing device and a second computing device, first media content from the communication session. For example, receiving the first media content from the communication session comprises receiving media content from the first computing device and second media content from the second computing device. The second media content can be received subsequent to the first media content. The operations can also include determining a first information item for display in the communication session, based at least in part on the first media content and the second media content. The operations can further include sending a first command to the first computing device and the second computing device to display the first information item.

Determining the first information item can be based on contextual information. The instructions can cause the hardware processor to perform further operations including sending a request for the contextual information to at least one of the first computing device and the second computing device, and receiving the contextual information from the at least one of the first computing device and the second computing device.

DETAILED DESCRIPTION

Figure 1:
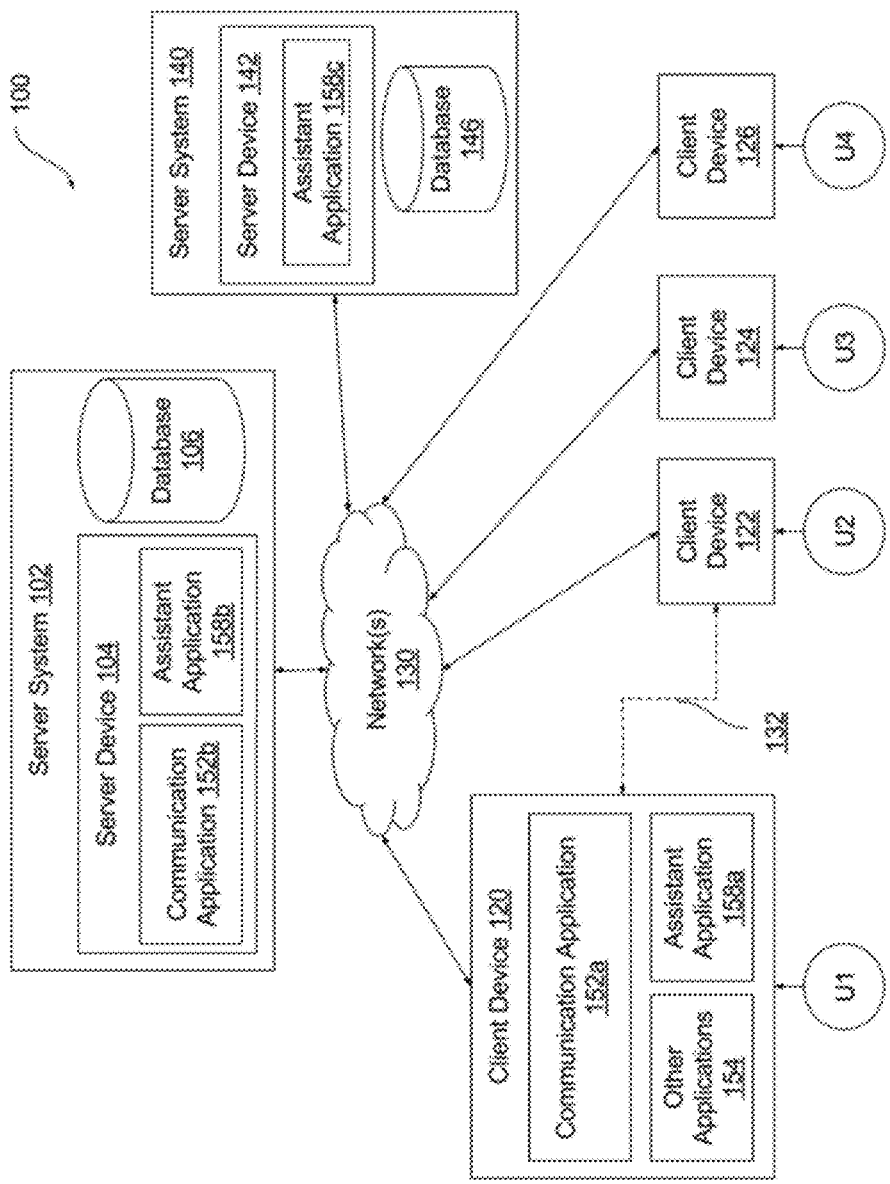
FIG. 1 is a block diagram of an example network environment which may be used for one or more implementations described herein.

Implementations of the subject matter in this application relate to providing assistance during a computer-mediated communication session conducted between participant users. Providing assistance may include providing information items that are suitable in the context of a conversation between participants in the communication session. For example, information items may include photos, audio, video, computer applications, etc. that are determined based on context of the conversation.

In some implementations, user permission is obtained for an assistant application to determine context based on media content during the communication session, e.g., audio, video, and/or text exchanged between participant users. In some implementations, the assistant application may determine context based on speech or text input provided by participants in the session, gesture input provided by participants in the session, etc. In some implementations, the assistant application may be invoked by a participant, e.g., by uttering an invocation phrase.

In some implementations, the assistant application may access public information sources, e.g., on the Internet, sources shared between participants, and if permitted by each participant user, respective user data of the participant users. The assistant application may retrieve information items, e.g., photos, documents, maps, recipes, restaurant information, sports scores, schedule information, etc. that match the conversation context from the information sources. The assistant application provides the information items to participants in the communication session. In implementations where the assistant application provides information items that are not shared with other participant users in the communication session, the assistant application obtains user permission prior to providing such information items in the communication session.

In some implementations, the assistant application may be turned on or off based on a user command. In some implementations, the assistant application may provide information items that are based on media content exchanged between participants during the communication session, e.g., a text transcript of audio exchanged during the communication session, a translation of speech exchange during the communication session, etc. In some implementations, the assistant application may provide a participant user in a communication session with a user interface that enables the participant user to view different conversation contexts and corresponding information items provided by the assistant application in a stacked or chronological manner, during and after the communication session.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 and server system 140 in the example of FIG. 1. Server systems 102 and 140 can communicate with a network 130, for example. Server system 102 can include a server device 104 and a database 106 or other storage device. Server system 140 can include a server device 142 and a database 146 or other storage device. In some implementations, server device 104 may provide a communication application 152b. Further, in some implementations, server device 104 may provide an assistant application 158b and/or server device 142 may provide an assistant application 158c.

Network environment 100 also can include one or more client devices, e.g., client devices 120, 122, 124, and 126, which may communicate with each other and/or with server system 102 via network 130. In some implementations, client devices 120-126 may communicate each other directly such that the communications between the client devices are not routed via a server system. In some implementations, client devices 120-126 may communicate with each other via a server system, e.g., server system 102. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, server system 140, server device 142, and database 146, and shows four blocks for client devices 120, 122, 124, and 126. Server blocks 102, 104, 106, 140, 142, and 146 may represent multiple systems, server devices, and network databases, and the blocks can be provided in different configurations than shown. In some implementations, server systems 102 and 146 may be controlled and/or operated by different owners or parties. For example, server system 102 may provide a communication application 152b from a first provider and an assistant application 158b from the first provider. Server system 140, controlled by a second provider that does not provide a communication application, may provide an assistant application 158c that can participate in a communication session provided by the communication application 152b.

For example, server systems 102 and 140 can represent multiple server systems that can communicate with other server systems via the network 130. In some implementations, server systems 102 and 140 can include cloud hosting servers, for example. In some examples, databases 106, 146 and/or other storage devices can be provided in server system block(s) that are separate from server devices 104 and 142, and can communicate with server devices 104, 142, and other server systems via network 130.

Also, there may be any number of client devices. Each client device can be any type of electronic device, e.g., desktop computer, laptop computer, portable or mobile device, cell phone, smart phone, tablet computer, television, TV set top box or entertainment device, home speaker, videoconferencing systems, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service, a communication application, or other type of network service, implemented on server system 102. For example, respective client devices 120, 122, 124, and 126 may communicate data to and from one or more server systems, e.g., systems 102 and/or 140. In some implementations, the server systems 102 and/or 140 may provide appropriate data to the client devices such that each client device can receive communicated content or shared content uploaded to the server system 102 and/or 140.

In some examples, users U1-U4 can interact via audio or video conferencing, audio, video, or text chat, or other communication modes or applications, e.g., communication applications 152*a* and 152*b*. A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide communication application 152*a*, assistant application 158*a*, and one or more other applications 154. Client devices 122-126 may also provide similar applications. For example, communication application 152*a* may provide a user of a respective client device (e.g., users U1-U4) with the ability to engage in a communication session with one or more other users. In some implementations, the communication session may be a synchronous communication session in which all participants are present at the same time. In some implementations, the communication session may include audio and/or video from each respective participant such that other participants can see and/or hear the respective participant during the communication session via a display screen and/or an audio speaker of their respective client devices. In some implementations, the communication may include text exchanged between participants, alternatively or in addition to audio and/or video.

In some implementations, one or more client devices may include an assistant application, e.g., the assistant application 158*a*. In some implementations, where participants provide consent to use of assistant application during a communication session, one or more of assistant application 158*a*, assistant application 158*b*, and assistant application 158*c* may analyze media content exchanged by the participants in the communication session to determine one or more information items to be provided to the participants during the communication session.

In some implementations, multiple assistant applications may be active during a communication session, e.g., one or more of assistant applications 158*a*, 158*b*, and 158*c* may be active and provide assistance during a communication session. In some implementations, different assistant applications may be configured to provide assistance in similar or different contexts. For example, one assistant application may include translation functionality, and may be invoked in response to a user request to provide translations of speech in audio content provided by participants in a communication session. In the same communication session, a second assistant application that provides contextual assistance, e.g., retrieves information from a shared repository of documents that are shared between participant users, may be active and provide assistance.

In some implementations, multiple assistant applications may interact with each other. For example, the assistant application that provides translations may provide input to the assistant application that provides contextual assistance, e.g., provide user speech in a language that the second assistant application can parse. In some implementations, assistant applications may interact with each other in a manner similar or different to how the assistant applications interact with human participants in the communication session. For example, the translation assistant application may utilize text-to-speech technology to provide speech output in a target language that is understood by a human participant. In this example, the translation assistant application may provide translated text directly to the second assistant application in addition to, or alternatively to providing speech. In some implementations, if multiple applications provide similar functionality, the user can indicate a preference for a particular assistant application of the multiple applications. In some implementations, the preference may be an explicitly indicated preference for the particular assistant application. In some implementations, when the users permit use of user data, the preference may be determined as an implicitly indicated preference, e.g. by ranking (or ordering) assistant applications based on various factors, e.g. user selection of the particular assistant application, user feedback or action based on the assistance provided, e.g., the user chooses an option provided by the particular assistant application, and not by other assistant applications, the user provides indication of user satisfaction, etc. as determined based on user interaction such as mouse clicks, taps, etc.

In some implementations, a provider of the communication application, e.g., that operates server device 104, may provide an assistant application. In some implementations, a third-party different from the participant users and the provider of the communication application, e.g., a third-party that operates server device 142, may provide an assistant application. In implementing the communication session with assistance, access to user data including media content exchanged during the communication session and other user data is provided to the assistant application upon specific permission from participant users. If multiple assistant applications are available, participant users are provided with options to select one or more particular assistant applications. Further, users are provided with options to control the user data that each assistant application is permitted to access, including options to deny access to user data to particular assistant applications.

In some implementations, client device 120 may include one or more other applications 154. For example, other applications 154 may be applications that provide various types of functionality, e.g., calendar, address book, e-mail, web browser, shopping, transportation (e.g., taxi, train, airline reservations, etc.), entertainment (e.g., a music player, a video player, a gaming application, etc.), social networking (e.g., sharing images/video, etc.), and so on. In some implementations, one or more of other applications 154 may be standalone applications that execute on client device 120. In some implementations, one or more of other applications 154 may access a server system that provides data and/or functionality of applications 154.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104 and/or server device 142, e.g., application software or client software in communication with server system 102 and/or server system 140. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

In some implementations, any of server system 102, and/or one or more client devices 120-126 can provide a communication application or communication program. The communication program may allow a system (e.g., client device or server system) to provide options for communicating with other devices. The communication program can provide one or more associated user interfaces that are displayed on a display device associated with the server system or client device. The user interface may provide various options to a user to select communication modes, users or devices with which to communicate, e.g., initiate or conduct a communication session, etc.

Figure 2A:
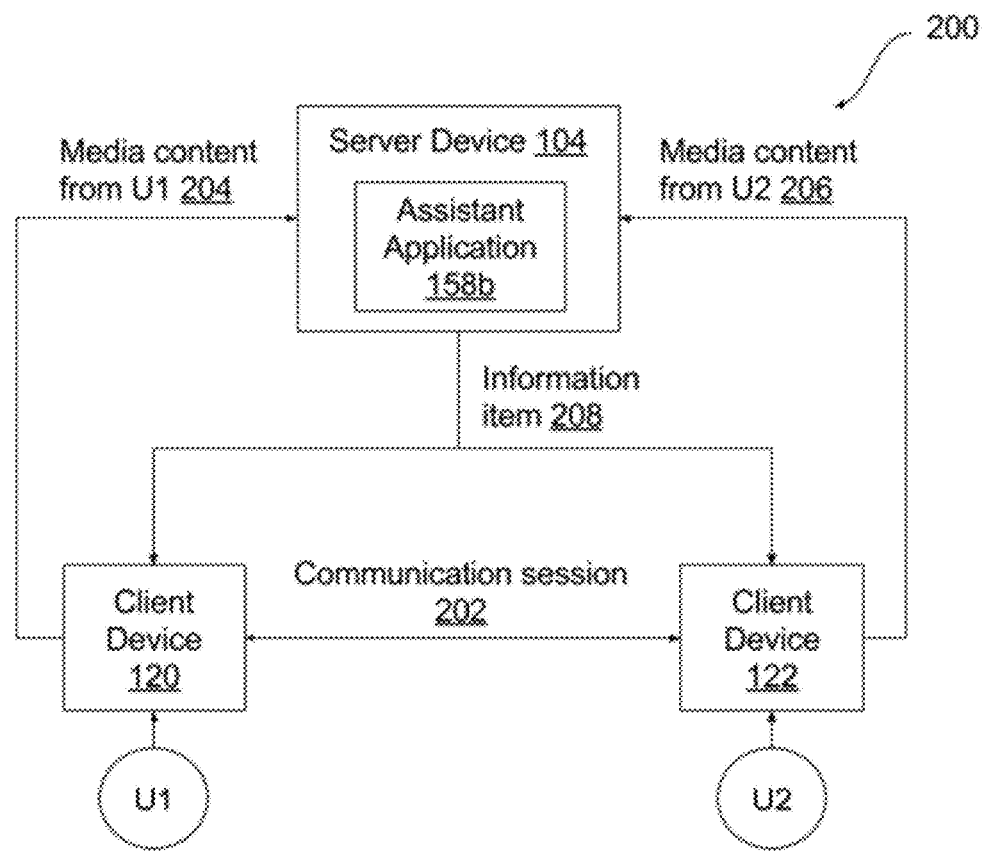
FIG. 2A is a block diagram illustrating an example configuration 200 in which a communication session with assistance may be provided, according to some implementations.

FIG. 2A is a block diagram illustrating an example configuration 200 in which a communication session with assistance may be provided, according to some implementations. In the example scenario illustrated in FIG. 2A, client device 120 and client device 122 are engaged in a communication session 202 that enables users U1 and U2 to communicate with each other, e.g., exchange media content such as audio and/or video. For example, user U1 may utilize a camera of client device 120 to capture video and a microphone of client device 120 to capture audio. The captured video and/or audio may be transmitted to client device 122 in the communication session 202. Communication session 202 is provided directly between client device 120 and client device 122 in a direct manner, such that server device 104 does not mediate the session. For example, communication session 202 may be conducted even when server device 104 is absent. Client devices 120 and 122 can communicate with each other via network 130 or can communicate directly (e.g., in a peer-to-peer manner). Communication applications in respective client devices 120 and 122 are configured to provide functionality to enable users U1 and U2 to exchange video, audio, other media, and/or text, in communication session 202. In the example illustrated in FIG. 2A, neither of client devices 120 and 122 is configured with an assistant application.

In implementations where participants in a communication session, e.g., users U1 and U2 in communication session 202, provide consent for automatic assistance, media content from the communication session 202 may be sent to server device 104 that includes assistant application 158*b*. For example, participants may be provided with options regarding media content to send to the server device 104, e.g., each participant can choose to provide audio only, video only, audio and video, etc. from the communication session to server device 104. Provision of media content to server device 104 is restricted in such a manner that server device 104 can utilize the media content in assistant application 158*b*. Other applications on server device 158*b* are denied access to the media content, or are provided access to the media content upon specific permission from respective users. If a participant denies use of their media content, such content is not provided to the server device 104. In various implementations, media content from respective client devices is encrypted such that it is readable by assistant application 158*b*.

Assistant application 158*b* on server device 104 may analyze media content from the communication session to identify one or more information items to be provided during the communication session. When such information items are identified, server device 104 may send the information items and a command to display the information item(s) one or more of client device 120 and 122. In some implementations, client devices 120 and 122 may display the information item(s) received from server device 104. In different implementations, an information item may be text, image(s), audio, video, web page(s), software application(s), etc. The command from the server may cause the client device to display a user interface that includes the information item(s), e.g., provide text, image, video, or web page(s) on a screen of the client device, play audio via a speaker or other available audio device, display a user interface of the software application on the client device, etc.

While FIG. 2A illustrates server device 104 that provides assistant application 158*b*, in some implementations, server device 142 and assistant application 158*c* may be used alternatively or in addition to server device 104 and assistant application 158*b*. For example, users that participate in a communication session may be provided with options, e.g., conduct session without use of an assistant application, use assistant application 158*b*, use assistant application 158*c*, use both assistant application 158*b* and assistant application 158*c*, etc. If users select to conduct the communication session without use of an assistant application, media content from the communication session is not sent to a server. If users select one or more of assistant applications 158*b* and 158*c*, media content from the communication session is provided to the selected assistant applications. In some implementations, it is possible to have multiple assistant applications. In the case of multiple assistant applications, the user can select one or more of the multiple assistant applications. Users are also provided options to opt out from assistance. Further, users are provided with options to disable individual assistant applications or disable assistance features entirely.

Figure 2B:
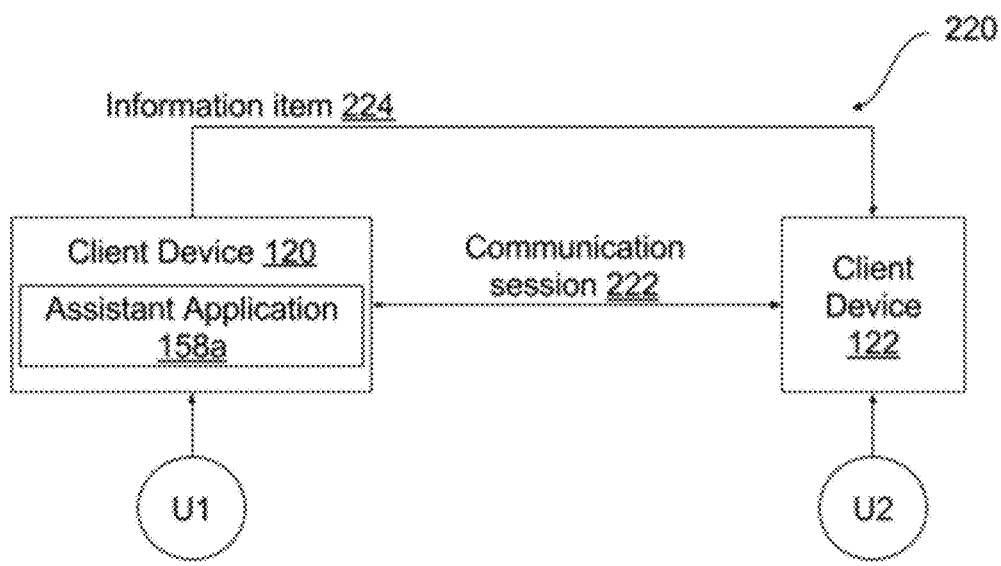
FIG. 2B is a block diagram illustrating another example configuration 220 in which a communication session with assistance may be provided, according to some implementations.

FIG. 2B is a block diagram illustrating another example configuration 220 in which a communication session with assistance may be provided, according to some implementations. In the example scenario illustrated in FIG. 2B, client device 120 and client device 122 are engaged in a communication session 222 that enables users U1 and U2 to communicate with each other, e.g., exchange media content such as audio and/or video. For example, user U1 may utilize a camera of client device 120 to capture video and a microphone of client device 120 to capture audio. The captured video and/or audio may be transmitted to client device 122 in the communication session 222.

Communication session 222 is provided between client device 120 and client device 122 in a direct manner, e.g., without use a communication application on a server system. Client devices 120 and 122 can communicate with each other via network 130 or can communicate directly (e.g., in a peer-to-peer manner). Communication applications in respective client devices 120 and 122 are configured to provide functionality to enable users U1 and U2 to exchange video, audio, other media, and/or text, in communication session 222.

In the example illustrated in FIG. 2B, one or more of client devices 120 and 122 is configured with an assistant application, e.g., assistant application 158*a*. In some implementations, assistant application 158*a* may be part of communication application 152*a*. In some implementations, assistant application 158*a* may be a standalone application distinct from communication application 152*a*. In some implementations, assistant application 158*a* may be part of an operating system of client device 120. In some implementations, assistant application 158*a* may be implemented in a modular manner, such that a portion of the assistant application is part communication application 152*a*, one or more other applications 154, an operating system of client device 120, etc. In the scenario illustrated in FIG. 2B, assistant application is a local application that executes on a client device. In some implementations, different client devices may be configured with different assistant applications, and participants in a communication session may be provided with options to choose a particular assistant application, use multiple assistant applications, etc.

During communication session 222, when users consent to use of assistant application 158*a*, assistant application 158*a* may receive and analyze media content from the communication session 222. For example, assistant application 158*a* may receive media content similar to server assistant application 158*b*, as described above. Assistant application 158*a* may determine one more information items, e.g., information item 224, and provide it in the communication session 222, similar to information item 208 as described above.

Figure 2C:
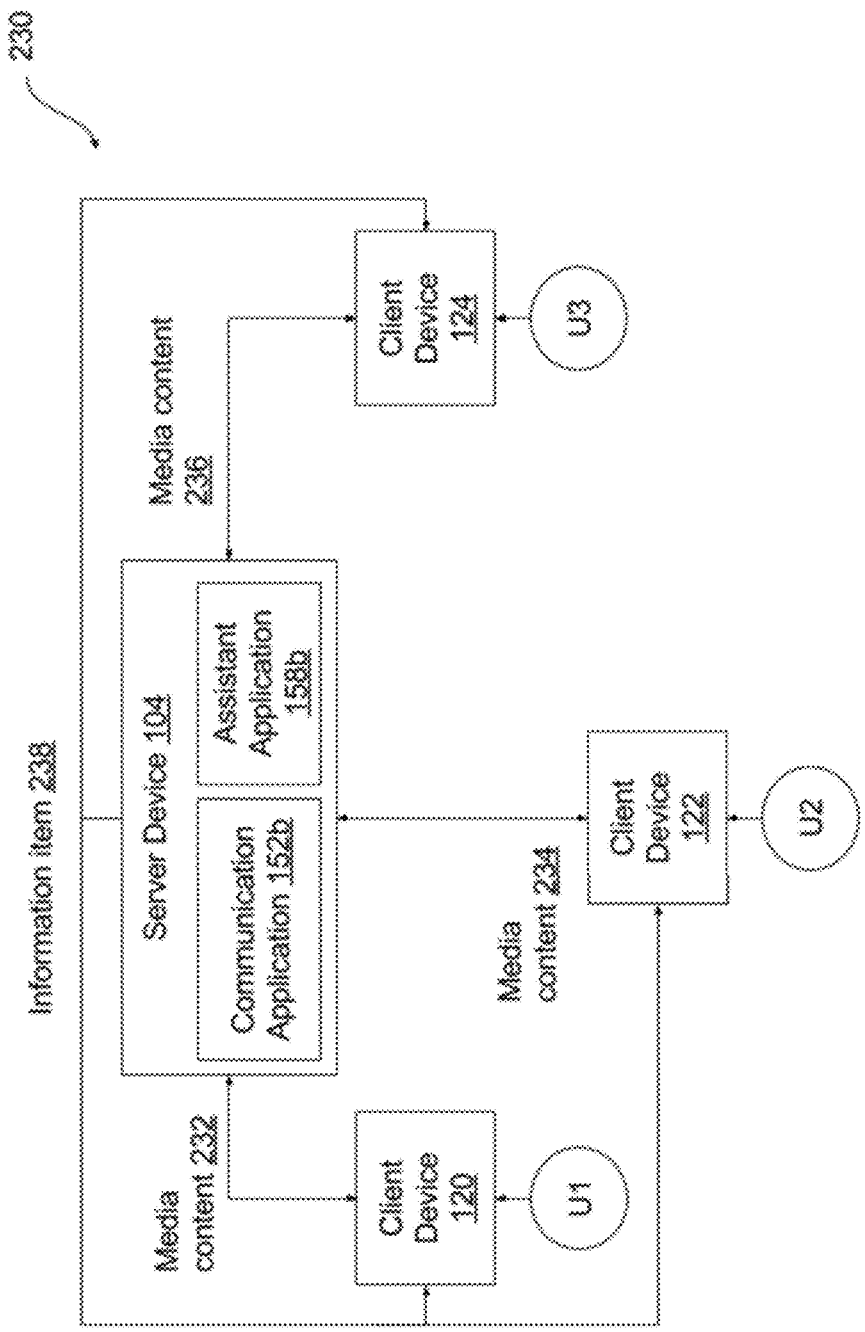
FIG. 2C is a block diagram illustrating another example configuration 230 in which a communication session with assistance may be provided according to some implementations.

FIG. 2C is a block diagram illustrating another example configuration 230 in which a communication session with assistance may be provided according to some implementations. In the example scenario illustrated in FIG. 2C, client device 120, client device 122, and client device 124 are engaged in a communication session that enables users U1, U2, and U3 to communicate with each other, e.g., exchange media content such as audio and/or video.

As illustrated in FIG. 2C, media content from the communication session between client devices 120, 122, and 124 is mediated by server device 104. The communication session is provided by communication application 152*b* on server device 104. Communication application 152*b* may coordinate exchange of media content between various participants, e.g., users U1, U2, and U3, in the communication session, by receiving media content from each client device and transmitting the received media content to other client devices that are in the communication session.

In some implementations, one or more of client devices 120, 122, and 124 may also be configured with a communication application 152*a*. In these implementations, communication application 152*a* may be a client-application that enables each respective client device to transmit and receive media content for the communication session. In some implementation, client-side application may be omitted, e.g., the communication session may be provided on a webpage in a browser such that client devices need not be configured with communication application 152*a* to participate in the communication session.

Respective media content captured by each of client devices 120, 122, and 124 is sent to server device 104. Communication application 152*b* on server device 104 transmits respective media content received from each client device to other client devices that participate in the session. In some implementations, media content is transmitted in the form of an audio and/or video stream. The audio/video stream sent by server device 104 to each client device may include media content received from other client devices in the communication session.

In the example illustrated in FIG. 2C, server device 104 is also configured with assistant application 158*b*. If users that participate in a communication session, e.g., users U1, U2, and U3, choose to enable assistant application 158*b*, server device 104 may provide respective media content received from each device to assistant application 158*b*. While FIG. 2C illustrates communication application 152*b* and assistant application 158*b* as part of server device 104, in some implementations, assistant application provided by a different server device, e.g., assistant application 158*c* provided by server device 142 may be used to provide assistance in the communication session, alternatively or in addition to assistant application 158*b*. In some implementations, assistant application 158*b* may be a part of communication application 152*b*. In some implementations, assistant application 158*b* may be separate from communication application 152*b*. In some implementations, different server devices may be configured with different assistant applications, and participants in a communication session may be provided with options to choose a particular assistant application, use multiple assistant applications, etc.

During the communication session, when users consent to use of assistant application 158*b*, assistant application 158*b* may receive and analyze media content. Assistant application 158*b* may determine one more information items, e.g., information item 238, and provide the information item in the communication session, similar to information item 208 as described above.

In different implementations, any combination of one or more client assistant applications 158*a*, and server assistant applications 158*b* and 158*c*, may be provided to determine and provide information items in a communication session. Different implementations may provide different technical benefits.

For example, the configuration illustrated in FIG. 2A may be advantageous, e.g., due to separation of communication session from the provision of assistant application. For example, by sending media content from a client device in the communication session 202 in parallel to other client devices in the communication session and server device 104, provision of assistance is separated from exchange of media content between participants. This may be beneficial, since delays in communications to and from server device 104, do not affect communication between participants. Further, if participants in communication session 202 choose to disable assistance features, transmission of media content 204 and 206 to server device 104 can be stopped, resulting in bandwidth savings. If participants choose to enable assistance features, transmission of media content 204 and 206 may be resumed. Further, assistant application 158b on server device 104 may benefit from the greater computational resources available on server device 104, in comparison to client devices 120-124. In implementations where users permit use of use data for assistance, server device 104 may access database 106 to retrieve user data for use by assistant application 158b. This may be advantageous, e.g., when users store user data such as photos/videos, calendar, documents, etc. on server device 104. In this configuration, assistant application 158b may also be updated, e.g., as new assistant features are developed, without need to update client devices 120-124.

In some implementations, the configuration illustrated in FIG. 2B may require less bandwidth, since there is no parallel transmission of media content to a server device. Further, when user provide permission to access and utilize user data for assistance features, an assistant application 158a on client device 120 may be able to retrieve local user data quickly and use such data to determine information item 224. Further, when users permit assistant application 158a to access contextual information, e.g., user location, recent user activity on client device 120, etc., assistant application 158a can conveniently retrieve such data locally.

In some implementations, the configuration illustrated in FIG. 2C may provide several advantages. The configuration in FIG. 2C utilizes server device 104 to provide the communication session and the assistant application. In this configuration, media content is available on server device 104, and may directly be utilized by assistant application 158b, when users choose enable assistance features.

While FIG. 2A and FIG. 2B illustrate a communication session that includes two client devices, and FIG. 2C illustrates a communication session that includes three client devices, it will be understood that assistance may be provided in a communication session that includes any number of client devices. Further, while each of client devices 120-124 is illustrated as being associated with a single user from users U1-U4, it may be understood that a client device in a communication session may be associated with multiple participants. For example, if a client device is a video conferencing system in a meeting room, the client device may be determined as associated with a plurality of participant users that are present in the meeting room. In another example, if two different users are in a field of view of a camera or are detected as speaking by a microphone of the client device, the client device may determine that there are two participants associated with the client device. For example, a television or home speaker device may be used for a family communication session, where multiple family members in a room where the television or home speaker device is location participate in the communication session. When a plurality of participants is associated with a client device, assistance features may be enabled or disabled, e.g., by an administrator user of the device, by consent of all participants, etc.

Figure 3:
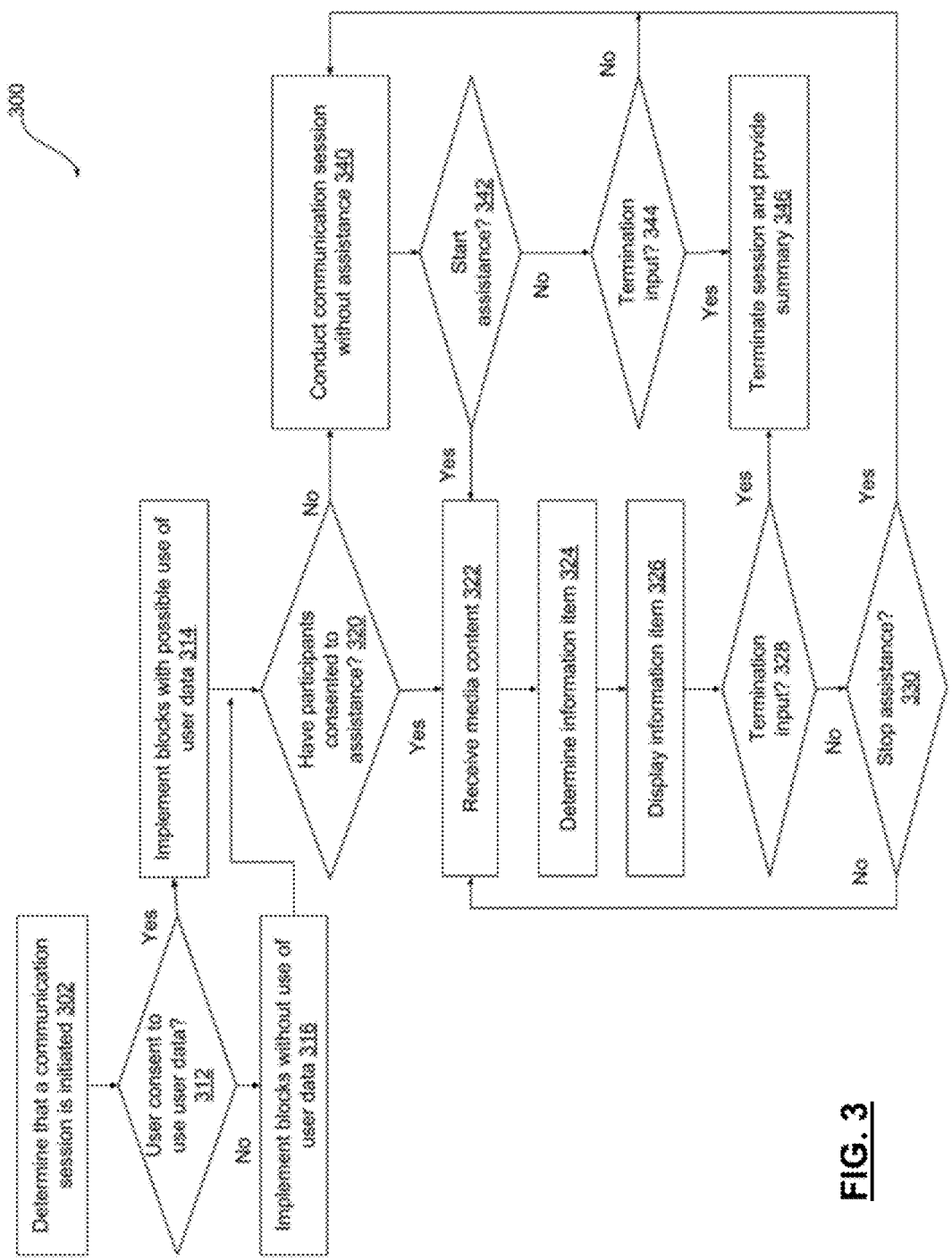
FIG. 3 is a flow diagram illustrating an example method 300 to provide information items during a communication session, according to some implementations.

FIG. 3 is a flow diagram illustrating an example a method 300 to provide assistance during a communication session, according to some implementations. In some implementations, method 300 can be implemented, for example, on a server system 102 as shown in FIG. 1. In some implementations, some or all of the method 300 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

In some implementations, the method 300, or portions of the method, can be initiated automatically by a system. In some implementations, the implementing system is a first device. For example, the method (or portions thereof) can be periodically performed, or performed based on one or more particular events or conditions, e.g., a communication session being initiated by a user, a user joining a communication session in progress, a user answering a request for a communication session, and/or one or more other conditions occurring which can be specified in settings read by the method. In some implementations, such conditions can be specified by a user in stored custom preferences of the user.

In some examples, the first device can be a camera, cell phone, smartphone, tablet computer, wearable device, television, set top box, home speaker, or other client device that can initiate or join a communication session based on user input by a user to the client device, and can perform the method 300. Some implementations can initiate method 300 based on user input. A user (e.g., operator or end-user) may, for example, have selected the initiation of the method 300 from a displayed user interface.

An image as referred to herein can include a digital image having pixels with one or more pixel values (e.g., color values, brightness values, etc.). An image can be a still image (e.g., still photos, images with a single frame, etc.), a dynamic image (e.g., animations, animated GIFs, cinemagraphs where a portion of the image includes motion while other portions are static, etc.) and a video (e.g., a sequence of images or image frames that may include audio). While the remainder of this document refers to an image as a static image, it may be understood that the techniques described herein are applicable for dynamic images, video, etc. For example, implementations described herein can be used with still images (e.g., a photograph, an emoji, or other image), videos, or dynamic images Text, as referred to herein, can include alphanumeric characters, emojis, symbols, or other characters.

In block 302, it is determined that a communication session is initiated. For example, a user may provide user input to initiate a communication session, e.g., an audio call, a video call, a messaging session, etc. and identify one or more other users that participate in the communication session. In another example, a communication session may be initiated automatically by a client device, e.g., at a scheduled time. In some implementations, a client device may determine that a communication session is initiated based on user input responding to an incoming request for a communication session, e.g., answering an incoming audio or video call. In some implementations, determining that a communication session is initiated may include determining that a communication session is in progress, and that a device that implements method 300 has joined the communication session in progress. In some implementations, determining that the communication session is initiated includes determining identities (e.g., user names, telephone numbers, email addresses, social media handles, etc.) of users that participate in the communication session. The method proceeds to block 312.

In block 312, it is checked whether user consent (e.g., user permission) has been obtained to use user data in the implementation of method 300. For example, user data can include media content sent or received by a user in a communication session, e.g., audio, video, etc., user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, a user's calendar or schedule, etc. One or more blocks of the methods described herein may use such user data in some implementations only upon specific consent from the user. User data for which the user has not provided consent is not used.

In some implementations, user consent is obtained from each client device that participates in the communication session. For example, if two users initiate an audio call, consent is obtained at each client device. In some implementations, e.g., when one or more of the client devices is a videoconferencing system, or a television, consent may be obtained for the user identity associated with the client device, e.g., an administrator user. In some implementations, user consent may be determined based on settings associated with the communication session. For example, if the communication session is a virtual meeting that makes use of client devices provided by an employer, it may be determined that each user has provided consent. In still some implementations, an organizer of the session, e.g., a teacher in a virtual classroom may provide consent. In some implementations, one or more of the users that participate in a communication session may choose to decline consent for use of user data. User data of such users is not in implementing method 300.

In some implementations, a permission command may be sent to one or more the computing devices (e.g., client devices 120-124) that participate in a communication session. The permission command may be configured to cause the computing devices to display a permission user interface, e.g., on a screen of the client device, via an audio prompt, etc. The permission user interface enables respective users of the computing devices (e.g., users U1-U4 of client devices 120-124) to provide respective permission indications. For example, in some implementations, e.g., the configurations illustrated in FIGS. 2A and 2C, a server device, e.g., server device 104 may send the permission command to the computing devices. In some implementations, e.g., the configuration illustrated in FIG. 2B, a client device 120, may send the permission command to other client devices that are in the communication session.

Respective users of the client devices that receive the permission command may provide respective permission indications, indicating respective user permissions for user data, e.g., media content from the client device, to be used to implement method 300. For example, each requested user may grant permission for use of user data, e.g., media content. In another example, one or more users may decline permission. In some implementations, users may grant permissions selectively. For example, a user may grant permission for use of certain user data, e.g., images, videos, and calendar, and deny permission for use of other user data. In these implementations, only such data for which the user has provided permissions is utilized in the implementation of method 300. In some implementations, a user may provide permission for use of media content generated by a client device of the user, e.g., audio and/or video for the communication session, and decline use of other user data. In the implementations, only the media content generated during the communication session is utilized in the implementation of method 300. The permission indications are sent to the device (e.g., server device 104 or client device 120) that sent the permission command. Based on the respective permission indications, it may be determined whether all users of have provided permission for use of user data, e.g., for use of the media content by a device that implements method 300.

If user consent has been obtained from the relevant user for which user data may be used in the method 300, then in block 314, it is determined that the blocks of the methods herein can be implemented with possible use of user data as described for those blocks, and the method continues to block 320. If user consent has not been obtained, it is determined in block 316 that blocks are to be implemented without use of user data, and the method continues to block 320. In some implementations, if user consent has not been obtained, blocks are implemented without use of user data and/or generic or publicly-accessible and publicly-usable data.

In some implementations, it is determined if each user in the communication session provided permission for use of user data, including media content from the respective client device. In some implementations, if any of the users decline permission for use of their user data, the communication session may be conducted without use of user data. For example, assistance features may be turned off during the communication session. In some implementations, assistance features may be enabled based on user data from only from those users that provided permission for use of user data. In some implementations, users may be provided with options to change their permission at any time during the communication session. When a user changes user permission to not allow use of user data, use of such data is immediately ceased.

In block 320, it is determined if participants in a communication session have consented to assistance, e.g., assistance provided by a system that implements method 300, during the communication session. In some implementations, if it is determined in block 312 that all users have provided user permission for use of user data, it may be determined that the users have consented to assistance and the method proceeds to block 322. In some implementations, e.g., when users have provided permission for use of their media content generated during the communication session, the media content is used to implement method 300. If the participants have provided consent to assistance during the communication session, the method proceeds to block 322. If it is determined that the participants have not provided consent, the method proceeds to block 340.

In block 322, media content from the communication session is received. In particular, received media content may include receiving audio, video, and/or text generated or provided in the communication session from various client devices that participate in the communication session. If users of one or more client devices do not provide user permissions to receive media content, such media content is not received. In some implementations, the communication session is a synchronous communication session in which participants are present at the same time and provide respective media content, e.g., audio, video, and/or text. For example, a synchronous communication session may include an audio call, e.g., a telephone call, a call using voice-over-IP technology, etc.; a video call, e.g., a call that includes both audio and video from one or more participants; a messaging session where different participants exchange text messages synchronously, etc. The method proceeds to block 324.

In block 324, one or more information items are determined based on the received media content. Determination of information items is explained with reference to FIG. 4. The method proceeds to block 326.

In block 326, the information item is displayed. In some implementations, the information item is displayed concurrently by each client device that participates in the communication session. In some implementations, a command is sent by a device that implements method 300 to the client devices in the communication session to display the information item. In some implementations, the command may cause each of the client devices in the communication session to retrieve the information item. For example, an information item may be a publicly available information item on the Internet, e.g., a map, information about a business such as a restaurant, a publicly available video, etc.

In some implementations, access to the information item may be restricted to specific users. For example, the information item may be a document, an image, or other content available to specific user accounts. In some implementations, the information item may be stored in a server system, e.g., in database 106. In some implementations, the information item may be stored in local storage of one or more of the computing devices in the communication session, e.g., client devices 120-124.

In some implementations, each client device that receives the command to display the information item retrieves the information item. In some implementations, a device that implements method 300 or any of the participating computing devices may send the information item to the computing devices in the communication session. For example, if the information item is stored in database 106, server device 104 may send the information item to computing devices in the communication session. In some implementations, the information item may be sent selectively to only those devices that request the information item from the server or another computing device in the communication session.

Figure 8:
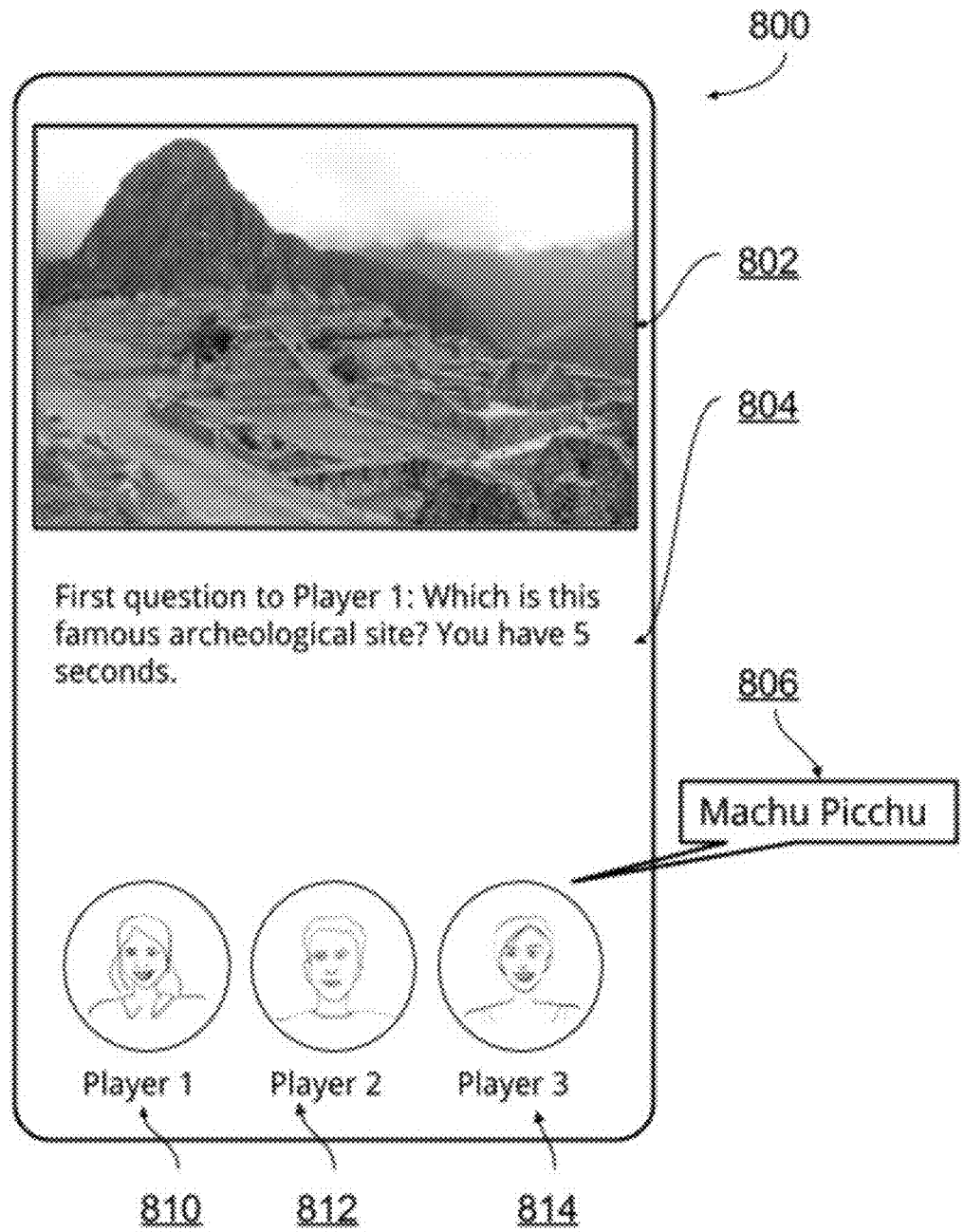
FIG. 8 is a diagrammatic illustration of an example user interface 800, according to some implementations.

In some implementations, e.g., when the information item includes audio, displaying the information item includes playback of the audio. In some implementations, e.g., when the information item includes video, displaying the information item includes playback of the video. In some implementations, the information item may be an interactive application, e.g., an application that executes within a communication application that provides the communication session. In these implementations, displaying the information item includes displaying an interactive user interface of the interactive application. For example, interactive application may be a document editing application, a game application, etc. In some implementations, the information item may be displayed such that it occupies a majority of the screen of computing devices that participate in the session, and media content, e.g., video from the communication session, is displayed in smaller size. FIG. 8 illustrates an interactive quiz application that is displayed in this manner. Displaying the interactive application in this manner may be advantageous, e.g., a participant user can modify a document in a document editing application while the communication session is in progress.

In some implementations, the information item may be based on the received media content. For example, the information item may include a text transcript of an audio portion of the received media content, a translation of the audio portion of the received media content to a different language, etc. In some implementations, the information item includes an augmentation or altered version of the received media content. For example, the information item may be an illustration to be displayed atop a video portion of the received media content. For example, if a participant in the communication session utters a phrase "Happy Valentine's Day!" or "I love you," the illustration may include hearts or balloons displayed atop a video portion. In other examples, for a birthday, balloons, confetti or other birthday-related graphics or phrases. In yet another example, illustration or phrases for achievement in a competition can be displayed such as trophies, a phrase such as "Congratulations!" or the like. While specific phrases are listed here, the assistant application may utilize techniques to determine equivalent phrases or emotions from speech and/or video during the communication session, e.g., by using a machine-learned model to determine such context. In another example, the information item may include audio received from a particular user, rendered in a different voice and/or accent, e.g., a celebrity's voice or accent. Some implementations can include context (or interest-based) information retrieval, when users permit determination of context. For example, such information may include hotel prices if it is detected that the conversation is about vacation, or traffic conditions if it is detected that the conversation is about an in-person meeting in the near future, e.g., in an hour. Some implementations can also include notifying both users of events or topics of interest to both users, for example, if it is determined both users are soccer fans, based on conversation context, the users may be notified of important developments, e.g., goals scored, in a soccer game of the users' interest.

In some implementations, e.g., in which the media content for the communication session includes a video from one or more of the participant users, the first command causes display of the information item such that a face or other content of the video is not obscured by display of the information item. For example, the received media content may be analyzed to determine whether a face or other content is present that is not to be obscured. Analysis of media content is described further with reference to FIG. 4. Face detection techniques may be utilized in such analysis. For example, a plurality of video frames in video received from participant users may be analyzed to determine a position of the face within the video content, and identify positions in the frames that do not include the face that may be suitable to display the information item. Detection of faces is performed when respective participant users have provided consent. When one or more faces are detected, the detected position of the faces are used to provide the first command, e.g., the information item is displayed such that a position of the information item does not obscure the one or more faces. In some implementations, when a user interacts with a user interface provided by an assistant application, e.g., scrolls user interface, increases a size of a user interface window, views items in a summary of the conversation in the communication session, positions and/or sizes of faces in video of the communication session are adjusted such that faces are not obscured by the user interface provided by the assistant application.

Other content from the video, e.g., one or more other faces, may also be determined. In some implementations, one or more visual characteristics of the user interface for the information item are selected such that the information item is easily visible to participants of the communication session. For example, if video displayed on a computing device, e.g., received from other participant users, is detected as having a dark or black background, the user interface may be displayed with text of the information item in white or a light color that provides contrast from the background. In another example, a plain background color (e.g., white) may be used for the user interface and the information items may be displayed atop the background such that the information items are easily visible. In some implementations, the user interface includes only the information items, e.g., displayed directly with video from the communication session, without other elements such as background, window borders, etc. In some implementations, the user interface is generated and displayed separate from video and/or images received as part of the communication session. In these implementations, the user interface is not part of a video feed exchanged between participant computing devices in the communication session, and is displayed as an overlay on the video feed. For example, the video feed may be exchanged directly between two client devices that participate in a communication session, while the user interface may be provided by a different computing device, e.g., server device 104, that implements an assistant application.

In some implementations, the command to display the information item may cause the information item to be displayed at a particular position relative to the face in the user interface such that the face is not obscured. In some implementations, the command to display the information item may cause the video from one or participant users to be adjusted, e.g., shrunk in display size, repositioned in the user interface, etc. based on the type and/or display size for the information item. For example, if the information item is a document, one or more of videos from participant users may be minimized, e.g., shrunk in size, or moved to a different location, e.g., to a top or bottom of the user interface, to one side of the user interface, etc. In some implementations, display of video may be turned off, e.g. temporarily, by the command to cause display of the information item. The method proceeds to block 328.

In block 328, it is determined whether the communication session is to be terminated, e.g., based on user input. If it is determined that termination input has been received and that the communication session is to be terminated, the method proceeds to block 346. If it is determined that termination input has not been received, the method proceeds to block 330.

In block 330, it is determined if there is user input indicative of a request to stop assistance during the communication session. For example, one or more users that participate in the communication session may provide input, e.g., a user command, to turn off assistance. In some implementations, a visual indicator that indicates an active or inactive status of assistance, e.g., that an assistant application or assistant program that provides assistance is active or inactive, may be provided in a user interface of the communication application. In some implementations, the visual indicator may be selectable. Upon user selection of the visual indicator that indicates active status of an assistant application (e.g., indicating that the user has provided a user command to turn off assistance), assistance is turned off, e.g., the assistant application or assistant program is disabled, terminated, denied access to media content from the session, etc. In some implementations, e.g., when the assistant application or assistant program is executed by a server device 104 that is not a participant in the communication session, the server device that provides the assistant application may be removed, e.g., disconnected, from the communication session. In some implementations, users may provide user input to turn off assistance e.g., by tapping, clicking on, or otherwise selecting the visual indicator. In some implementations, users may provide voice input or speak a command to turn off assistance. When assistance is turned off, media content from the communication session, e.g., audio, video, or text, exchanged between participant users, is not available to the assistant application. In some implementations, some users in the communication session may be restricted from providing input to turn off assistance. In these implementations, for the users who are restricted from providing input to turn off assistance, the visual indicator is not selectable. For example, during a communication session that is a job interview, the person who initiates or manages the session, e.g., an interviewer, may selectively enable assistant restrictions, e.g., one-way assistance or assistance limited to certain features such as calendar. If one or more users in the communication session provide input to turn off assistance, the method proceeds to block 340. Else, the method proceeds to block 322 to receive subsequent media content in the communication session.

In block 340, the communication session is conducted without assistance. For example, if participant users in the communication session do not provide consent for assistance in block 320, or if one or more participant users provide user input to stop assistance, block 340 may be performed. When assistance is turned off, media content is not provided to an assistant application, e.g., assistant application 158a, 158b, and 158c. The method proceeds to block 342.

In block 342, one or more users may provide user input to start assistance, e.g., by selecting visual indicator that indicates the status of assistance. In response to the user input, it is determined whether the participant users have consented to assistance. In some implementations, a user interface may be displayed to those participant users that have not provided consent for assistance and their consent is obtained. The user input to start assistance includes such input. When one or more participant users decline consent for assistance, it is determined that assistance cannot be started and the method proceeds to block 344. If user input is received to start assistance and participant users consent to start assistance, the method proceeds to block 322.

In block 344, it is determined whether the communication session is to be terminated, e.g., based on user input. If it is determined that termination input has been received and that the communication session is to be terminated, the method proceeds to block 346. If it is determined that termination input has not been received, the method proceeds to block 340.

Figure 7:
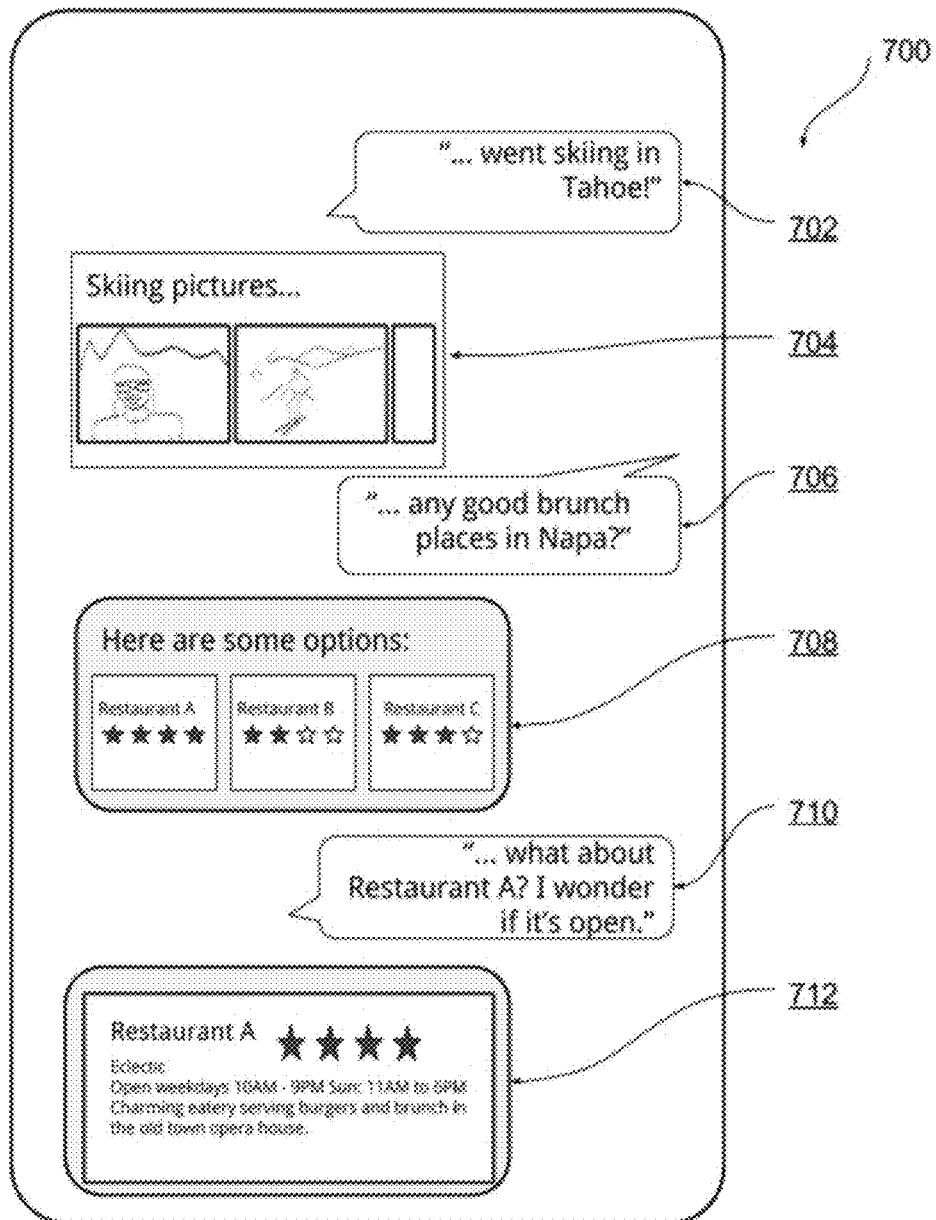
FIG. 7 is a diagrammatic illustration of an example user interface 700, according to some implementations.

In block 346, the communication session is terminated. For example, a server device 104 that hosts the communication session, e.g., as illustrated in FIG. 2C, may terminate the communication session. In another example, e.g., when client devices engage directly in a communication session, as illustrated in FIGS. 2A and 2B, one or more of the client devices may terminate the communication session. In some implementations, upon termination of the communication session, a session summary is provided. For example, the session summary may include a text transcript of one or more portions of media content received during the communication session and one or more information items provided during the communication session. An example session summary is illustrated in FIG. 7. In some implementations, the session summary can also include one or more follow up actions, e.g., propose to set up a reminder or calendar event for an item mentioned in the conversation.

Figure 4:
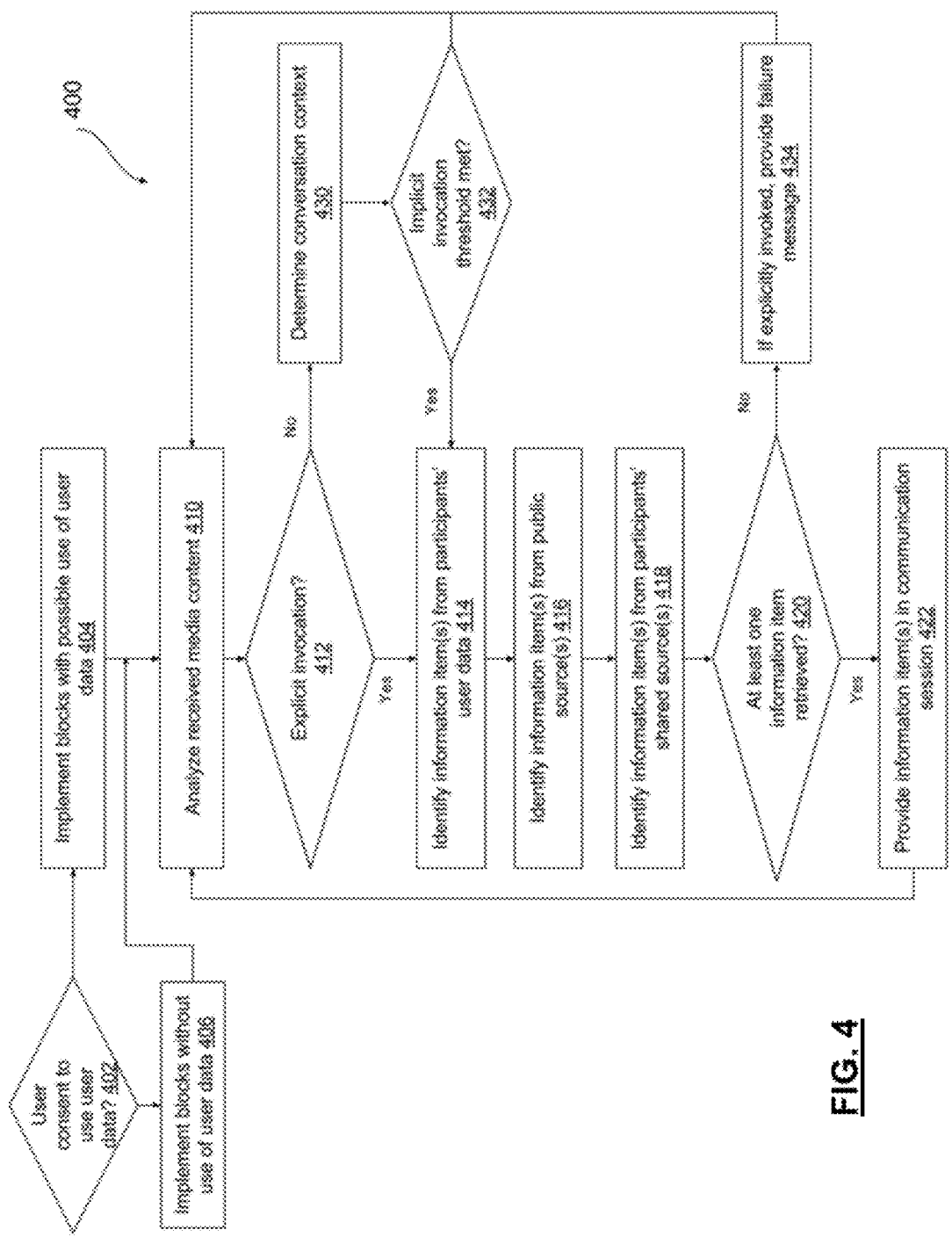
FIG. 4 is a flow diagram illustrating an example method 400 to determine information items during a communication session, according to some implementations.

FIG. 4 is a flow diagram illustrating an example a method 400 to provide information items in a communication session, according to some implementations. In some implementations, method 400 can be implemented, for example, on a server system 102 as shown in FIG. 1. In some implementations, some or all of the method 400 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 400. In some examples, a second device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a second device. For example, the method (or portions thereof) can be periodically performed, or performed based on one or more particular events or conditions, e.g., media content being received during a communication session.

In one example, the second device can be a camera, cell phone, smartphone, tablet computer, wearable device, television, set top box, home speaker, or other client device that can engage in a communication session based on user input by a user to a client device, and can perform the method 400.

In block 402, it is checked whether user consent (e.g., user permission) has been obtained to use user data in the implementation of method 400. For example, user data can include media content sent or received by a user in a communication session, e.g., audio, video, etc., user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, a user's calendar or schedule, etc. One or more blocks of the methods described herein may use such user data in some implementations only upon specific consent from the user. User data for which the user has not provided consent is not used.

In some implementations, user consent is obtained from each client device that participates in the communication session. For example, if two users initiate an audio call, consent is obtained at each client device. In some implementations, e.g., when one or more of the client devices is a videoconferencing system, or a television, consent may be obtained for the user identity associated with the client device, e.g., an administrator user. In some implementations, user consent may be determined based on settings associated with the communication session. For example, if the communication session is a virtual meeting that makes use of client devices provided by an employer, it may be determined that each user has provided consent. In still some implementations, an organizer of the session, e.g., a teacher in a virtual classroom may provide consent. In some implementations, one or more of the users that participate in a communication session may choose to decline consent for use of user data. User data of such users is not in implementing method 300.

If user consent has been obtained from the relevant users for which user data may be used in the method 400, then in block 404, it is determined that the blocks of the methods herein can be implemented with possible use of user data as described for those blocks, and the method continues to block 410. If user consent has not been obtained, it is determined in block 406 that blocks are to be implemented without use of user data, and the method continues to block 410. In some implementations, if user consent has not been obtained, blocks are to be implemented without use of user data and/or generic or publicly-accessible and publicly-usable data.

In block 410, received media content is analyzed. For example, media content may be received as described above with reference to block 322 of FIG. 3. In some implementations, media content may include audio, video, and/or text provided by one or more participant users via respective computing devices, e.g., client devices 120-124, in the communication session. Analysis of received media content may be performed using one or more of several different techniques.

In some implementations, the received media content may include audio. In these implementations, speech-to-text techniques may be used to determine the contents of a user's speech. In some implementations, speech-to-text techniques may utilize a machine-learning application that utilizes a trained model to convert speech to text. In some implementations, the trained model may be implemented with a neural network that includes long short-term memory (LSTM) nodes. In some implementations, speech biasing might be adjusted specifically for an audio call. In some implementations, the trained model might be trained specifically for audio and/or video calls, e.g., the model is trained such that training data used to train the model excludes audio and video data from sources that are not audio or video conversations. The model can be re-trained (or adjusted) on the fly, e.g., during or after a particular conversation. Further, if permitted by the user, parameters of the model can be saved and associated with a user. This can enable the model to be initialized for the particular user with the saved parameters, e.g., when a next conversation that includes the user is started. In some implementations, analysis of audio may include determining a source language spoken by a participant user. In some implementations, the received audio may include music. In these implementations, audio fingerprinting techniques may be used to identify the music, e.g., a song title. In some implementations, analyzing the audio may include determining whether a user has provided a command to explicitly invoke assistance during the communication session.

In some implementations, the received media content may include video. In these implementations, video analysis techniques such as face detection, motion detection, gesture detection, etc. may be utilized to analyze received media content. For example, analysis may be performed to determine whether video from a client user includes a gesture that is associated with explicit invocation for assistance during the communication session. In another example, analysis may be performed to determine a position of one or more faces in the video. The position of the one or more faces is utilized, e.g., to generate the first command such that display of information items does not obscure the one or more faces.

In some implementations, the received media content may include text. In some implementations, text analysis may be performed, e.g., using pattern matching, topic detection, etc. to determine whether the text (or text transcribed using speech-to-text techniques) in the communication session includes an explicit invocation for assistance. In some implementations, text analysis may be performed to determine a topic of conversation during the communication session, e.g., ski trip, brunch, etc.

In some implementations, the received media content may include a locally-generated representation of user activity, generated by a respective client device of one or more participant users. For example, in some implementations, one or more client devices may be configured with a machine-learning application that generates the representation of local user activity. For example, the machine-learning application may perform speech-to-text conversion to generate the locally-generated representation in text form, when the local user activity is a user speaking during the communication session. In some implementations, the locally-generated representation may be in a machine-readable form. The locally-generated representation may be smaller in size than audio or video transmitted from the respective client device. Transmitting a locally-generated representation instead of the audio or video may reduce bandwidth requirements while enabling a device that implements method 400 to perform the analysis to determine one or more information items.

In these implementations, a device that implements method 400 may include a machine-learning application that analyzes the locally-generated representation in machine-readable form to draw inferences. For example, the inferences may include determining whether the user speech included an explicit invocation for assistance during the communication session, determining a gender of the speaker, an estimated age of the speaker, whether the speaker is indoor or outdoor, a language that the speaker speaks during the communication session, etc. based on the locally-generated representation. In another example, e.g., when the locally-generated representation is based on video transmitted from the respective client device, the machine-learning application may provide inferences such as whether a face is present in the video, a position of the face, a number of faces in the video generated by the client device, etc. The inferences may be used to determine information items.

In block 412, it is determined whether the received media content included an explicit invocation for assistance during the communication session. For example, a participant user may speak a particular phrase, e.g., "Assistant, show my calendar," "Assistant, show me on a map," etc. In this example, the phrase "Assistant" may be an invocation phrase or hotword that indicates explicit invocation. The phrase "Assistant" is one example, and users may select any phrase of their choice to invoke assistance. In some implementations, explicit invocation of assistance features may include a text command (e.g., "@assistant, show my pictures") or gesture, e.g., a particular gesture associated with invocation of assistance features. If it is determined that the media content included an explicit invocation, the method proceeds to block 414. If it is determined that the media content did not include an explicit invocation, the method proceeds to block 430.

In block 430, conversation context in the communication session is determined. For example, if audio in the media content from a first user U1 in the communication session includes a phrase "went skiing in Tahoe," followed by audio in the media content from a second user U2 in the communication session includes a phrase "You must have amazing pictures!" and subsequently a phrase "let me show you the photos" from U1, it may be determined that the context includes "skiing," "Tahoe," and "pictures". Further, when user U1 permits access to user data, e.g., photos, it may be determined that the user has recent photos taken at Lake Tahoe. Based on the context and user data that matches the context, it may be determined with high confidence score that the conversation context indicates implicit invocation. In another example, if a user utters a phrase "I wonder how far restaurant A is," it may be determined with high confidence score that the user is interested in knowing the distance to restaurant A from the user's current location. In yet another example, a discussion with phrases such as "That's interesting! Tell me more," or "I don't know about that" may indicate a conversation where it is unlikely that the user would benefit from assistance and hence, a low confidence score may be associated with invocation.

In some implementations, when users permit use of user activity and feedback data, past user actions and/or feedback upon a determination of implicit invocation may be utilized to determine the confidence score. For example, if implicit invocation was determined in the past, but the user didn't interact with information items that were provided as assistance, it may be determined that the conversation context may have been unsuitable to invoke assistance. In another example, if user provides feedback, e.g., turns off assistance, dismisses information items, etc., it may be determined that the conversation context may have been unsuitable to invoke assistance. In some implementations, users may provide user preferences for implicit invocation, e.g., "do not invoke when I speak with person P," "always invoke when I speak with person M," "invoke during scheduled meetings, but not during unscheduled calls," etc. In some implementations, when users permit use of user interaction data, the interaction data may be utilized to determine suitable contexts to provide assistance. For example, in the case of explicit invocation by a user, the context prior to the explicit invocation can be used as an example of a context where automatic provision of assistance is appropriate.

In some implementations, a request for contextual information is sent to one or more of the computing devices that participate in the communication session. For example, the request may indicate the computing device provide information such as a current location and/or past locations of the computing device, recent user activity on the computing device, user profile information stored locally on the computing device, etc. for determining context during the communication session. The computing device may be configured to determine whether the user has provided permission to provide such information. If the user of the computing device has provided permission, the requested contextual information is sent in response to the request. In some implementations, contextual information from the computing devices in the communication session may assist in determining whether assistance has been invoked. In some implementations, the contextual information may be used to identify one or more information items, as described below. The contextual information from the user device may be beneficial, since it can provide additional contextual signals, in addition to the context determined based on media content received from the device. The method proceeds to block 432.

In block 432, it is determined whether the confidence score determined for implicit invocation meets a threshold. In some implementations, a session-specific confidence score threshold may be set for each communication session. For example, if users permit access to past interaction data, a communication session where participant users are determined to make high use of assistance features may have a relatively low confidence score threshold. In another example, if users in a particular communication session are less likely to make use of assistance, the confidence score threshold may be set at a relatively higher value. In different implementations, the confidence score threshold is set such that users benefit from implicit invocation of assistance. Confidence score threshold may also be adjusted during a communication session, e.g., based on user actions to choose or dismiss assistance notifications during the communication session. In some implementations, the confidence score can be based on the trained model from prior sessions, e.g., that indicate a likelihood that a user is likely to find assistance valuable or not. Further, the confidence score may be adjusted based on a detected topic or context of conversation. For example, assistance features that are fun features (e.g., "hearts," "balloons," "face masks," etc.) may be turned off, e.g., have a low confidence score, based on determination that a particular conversation is a business conversation. Triggering of assistance based on the conversation may be based on the conversation, e.g., content in the conversation provided by multiple participants. The confidence score may be determined to meet the threshold based on contribution to the conversation from individual participants and/or interaction between participants. For example, if User1 mentions "weather" and assistance is triggered, assistance is also triggered, e.g., if User2 subsequently mentions "weather." The method proceeds to block 414.

In block 414, when participant users in a communication session permit access to user data, information items of one or more participants may identified in response to the invocation. For example, such information items may include a user's documents, photos, videos, calendar, location information, etc. Users may be provided with options to indicate permissions for individual information items, information item types, etc. to exclude. When the invocation is explicit, e.g., "Assistant, show my calendar," the corresponding information items are identified based on a user-initiated command. When the invocation is implicit, e.g., "let me show you my photos," the conversation context may be utilized to identify information items, e.g., a user's photos from a recent trip to Lake Tahoe. In some implementations, e.g., where participant users do not permit access to user data, block 414 is not performed. The method proceeds to block 416.

In block 416, information items from one or more public sources may be identified. For example, public sources may include any type of available source, such as maps, sports schedules and scores, news websites, recipes, etc. that is identified based on the invocation. For example, if the user's conversation context includes "restaurant A," a map showing the location A may be identified. In another example, if the user's conversation context includes "Roger Federer" and "Wimbledon," information may be retrieved, e.g., from a knowledge graph, about the number of Wimbledon titles Roger Federer has won, most recent result at Wimbledon for Roger Federer, etc. The method proceeds to block 418.

In block 418, information items from sources that are shared between participant users, e.g., shared folders of computer files, shared photo albums, shared documents, etc. may be identified. For example, when the communication session is a meeting, a meeting agenda and one or more documents to be reviewed during the meeting may be retrieved. In some implementations, retrieval of information items from shared sources may be performed based on user accounts at a server system that provides the shared sources, e.g., a file sharing service, a photos service, etc. when users provide consent for such automatic retrieval. In some implementations, one or more shared permissions can be used. For example, the shared permissions may indicate that an assistant application may surface information item(s) that can be seen by multiple or all participants in the conversation, e.g., documents, images, videos, etc. to which all participants have access per an access control policy. In this example, prior to providing the information item(s), a check may be performed to determine which of the participants can access the information. For example, the check may be based on recognizing the participants, e.g., if the users permit, by use of facial recognition techniques, based on a user account, etc. The method proceeds to block 420.

In block 420, it is determined whether at least one of the retrieved information items matches the conversation context or the explicit invocation. For example, if the conversation context indicates "skiing," "Lake Tahoe," and "photos" and if no photos are identified that match the context, it may be determined that the retrieved information items are not suitable for provision in the communication session. In another example, if the explicit invocation indicates "Document A," and if no matching document is found, it may be determined that there are no information items that meet the threshold. If no information items are retrieved, the method proceeds to block 434. If at least one information item is retrieved, the method proceeds to block 422. In some implementations, a different criterion, e.g., "at least two information items" may be used. In some implementations, the criterion may be based on the conversation context or the explicit invocation. For example, if the explicit invocation is for three most recent videos, the criterion may be set as "at least three information items." Some implementations can include multiple criteria. Some of the criteria can be more strict than other criteria. Based on the strictness, information items can be presented in different ways. For example, if it is detected that the conversation is about a particular document, e.g., a user speaks about a document with the title "My important report," and that a document that matches the title is available in the user's files, the document may be provided in the communication session. However, if there is no document that has an exact match to the title (e.g., one or more available documents are possible matches, e.g., have a substring that matches the title), an assistant application may provide a user interface for a conversation participant (e.g., an owner of the document) that enables the conversation participant to select a document from the one or more available documents, or to create a new document with the title.

In block 434, it is determined if assistance was explicitly invoked. If assistance was explicitly invoked, but matching information items were not identified, a failure message, e.g., "unable to retrieve requested document," may be provided, e.g., to be displayed in a user interface during the communication session. The method proceeds to block 410 where further media content received in the communication session is analyzed.

In block 422, one or more of the identified information items are provided in the communication session. In some implementations, the information item may be a user interface that indicates that the assistant application is performing a particular activity. For example, in some implementations, the assistant application may provide note taking functionality, in response to explicit invocation, e.g., "Assistant, take notes" or implicit invocation. In these implementations, the information item is a user interface that indicates that the assistant application is taking notes, e.g., if a participant user in the communication session speaks and lists ingredients from a recipe, the assistant application may transcribe the speech to make a list of the ingredients. In some implementations, a participant user may further invoke the assistant, e.g., to add the list of ingredients from the notes to a shopping list, and set a reminder to purchase the ingredients during a subsequent trip to a grocery store. In some implementations, the notes may be added to a meeting summary that is provided by the assistant application at the end of the communication session. The method proceeds to block 410 where further media content received in the communication session is analyzed.

Figure 5A:
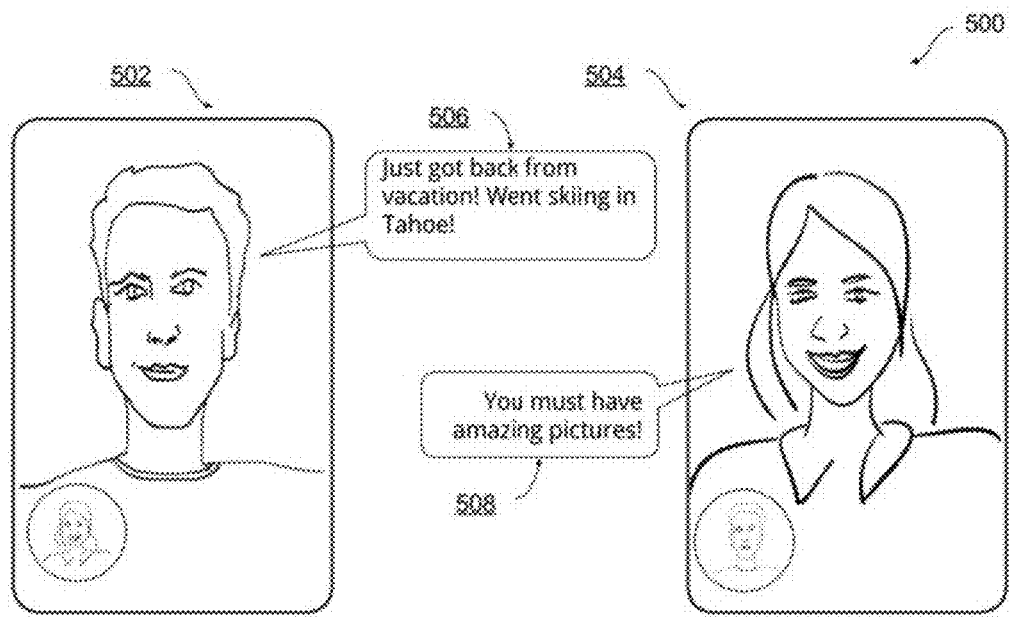
FIG. 5A is a diagrammatic illustration of an example user interface 500, according to some implementations.

FIG. 5A is a diagrammatic illustration of an example user interface 500, according to some implementations. In the example shown in FIG. 5A, users of computing devices 502 and 504 are engaged in a communication session. In the example shown in FIG. 5A, the communication session is a video call. Device 502 displays video received from device 504 in large size and video generated at device 502 in smaller size. Similarly, device 504 displayed video received from device 502 in large size and video generated at device 504 in smaller size. The user of device 504 has spoken phrase 506 "Just got back from vacation! Went skiing in Tahoe!" to which the user of device 502 has responded with phrase 508 "You must have amazing pictures!"

Figure 5B:
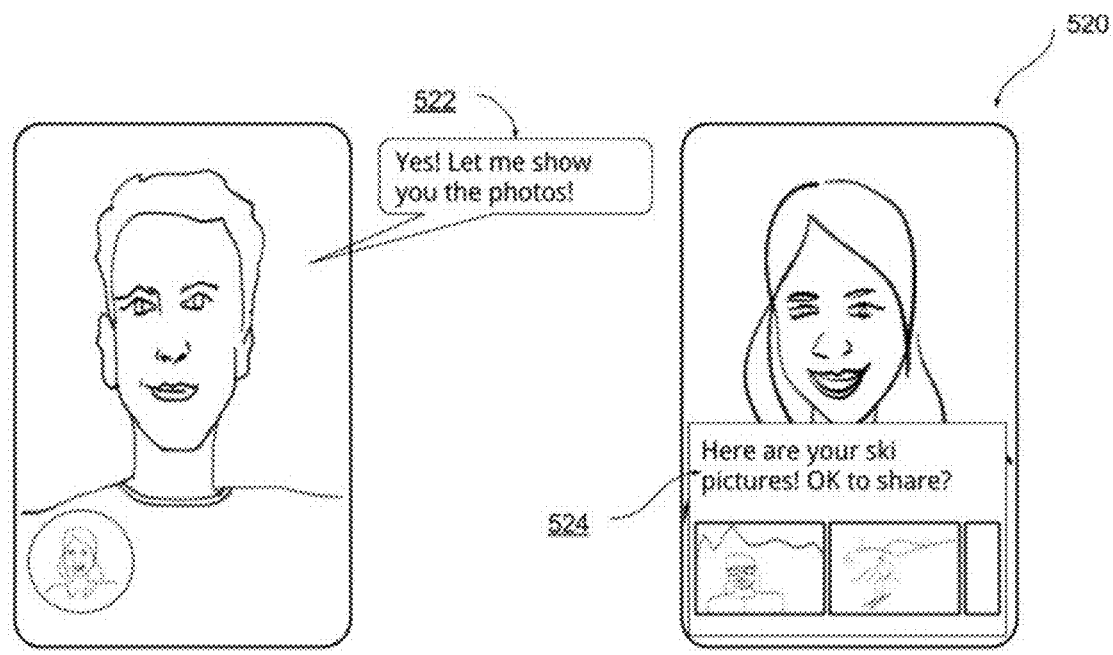
FIG. 5B is a diagrammatic illustration of an example user interface 520, according to some implementations.

FIG. 5B is a diagrammatic illustration of an example user interface 520, according to some implementations. Continuing the example illustrated in FIG. 5A, the user of device 504 responds to the user of device 502 with phrase 522 "Yes! Let me show you the photos!" In response to the user interaction, it is determined that assistance is invoked. A user interface 524 is displayed on device 504 with information items determined based on the context, e.g., as determined from phrases 506, 508, and 522.

User interface 524 includes photos in a photo library of the user of device 504 that match the context, e.g., photos from a recent ski trip to Lake Tahoe. Further, it is determined that the photos are private, e.g., not shared with the user of device 502. User interface 524 includes a message "Here are your ski pictures! OK to share?" that the user can select to share the photos with the user of device 502. In some implementations, a first command is sent to a first computing device, e.g., the device 504, to display a user interface 524 that includes a selectable user interface element (e.g., the text "OK to share?") that a user of the device can select to indicate user permission to share the photos during the communication session. In response to user selection indicating that the user has provided permission to share the photos, an indication is sent to the device that sent the first command, e.g., server device 104, that the user has provided the permission to share the photos. Server device 104, or another client device that provides assistance, sends a subsequent command to display the photos in the communication session. If the user chooses to not share the photos in the communication session, the photos are not displayed in the communication session. While this example illustrates providing a user interface in the communication session with photos when permission is provided by the user, any type of information item may be shared in the communication session when users provide permissions for sharing.

In some implementations, e.g., when the photos are previously shared with the user of device 502, if the photos are publicly available, or if the user of device 504 has previously provided permission to share photos in communication sessions, the user interface 524 may not be displayed, and instead, the identified information items, e.g., photos are automatically displayed in the communication session.

Figure 5C:
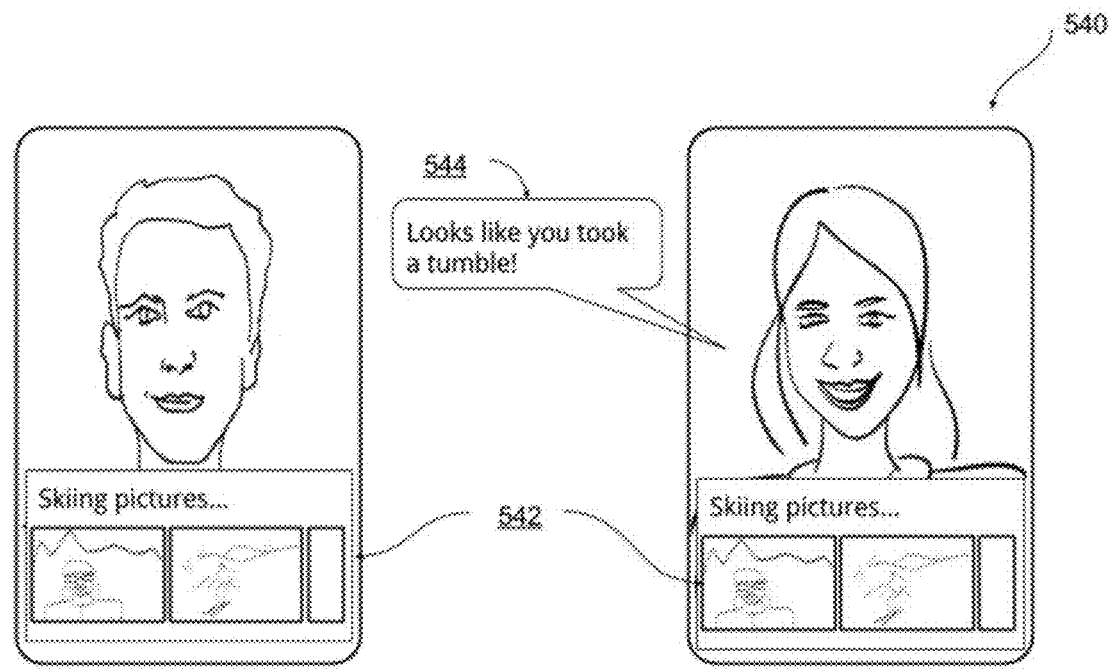
FIG. 5C is a diagrammatic illustration of an example user interface 540, according to some implementations.

FIG. 5C is a diagrammatic illustration of an example user interface 540, according to some implementations. Continuing the example illustrated in FIG. 5B, the user of device 504 has granted permission to share photos in the communication session. As illustrated in FIG. 5C, user interface 542 that includes the photos is displayed concurrently on each of devices 502 and 504. In some implementations, either or both of the users in the communication session may control the user interface, e.g., scroll the photos, zoom into a particular photo, etc. In response to user input, e.g., to scroll the photos, the user interface on both devices is updated. As illustrated in FIG. 5C, the user of device 502 has responded with phrase 544 "Looks like you took a tumble!"

Figure 6A:
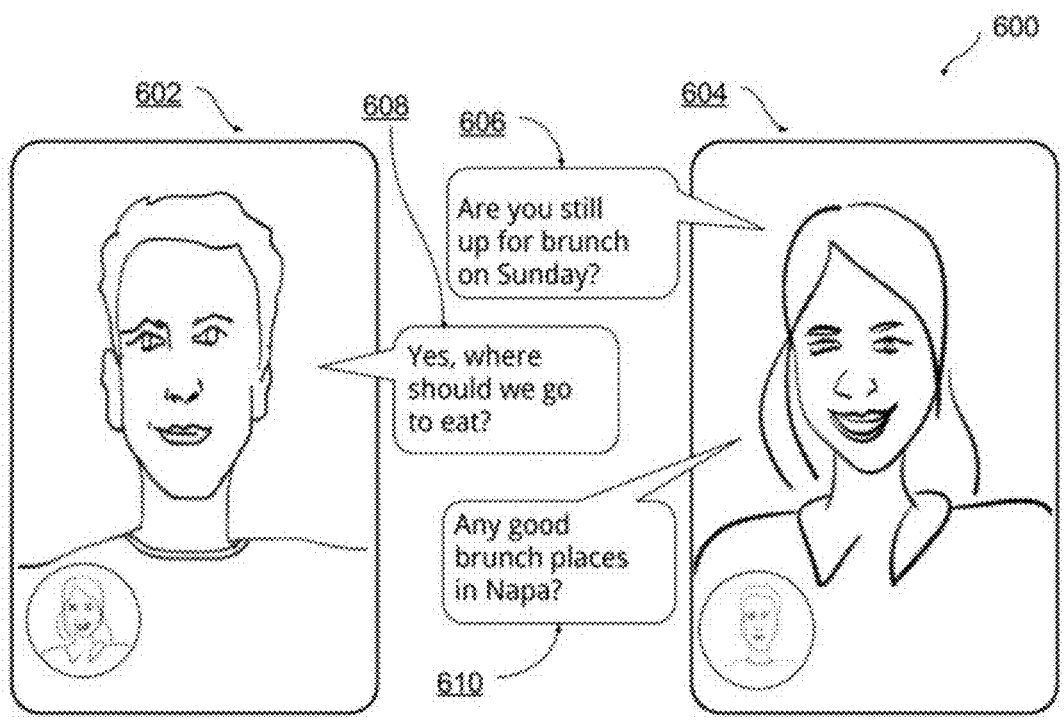
FIG. 6A is a diagrammatic illustration of an example user interface 600, according to some implementations.

FIG. 6A is a diagrammatic illustration of an example user interface 600, according to some implementations. In the example shown in FIG. 6A, users of computing devices 602 and 604 are engaged in a communication session. In the example shown in FIG. 6A, the communication session is a video call. Device 602 displays video received from device 604 in large size and video generated at device 602 in smaller size. Similarly, device 604 displayed video received from device 602 in large size and video generated at device 604 in smaller size. The user of device 602 has spoken phrase 606 "Are you still up for brunch on Sunday?" the user of device 604 has responded with phrase 608 "Yes, where should we go to eat?" and the user of device 602 has responded with phrase 610 "Any good brunch places in Napa?" The conversation context for the communication session illustrated in FIG. 6A is determined, e.g., that the context includes "brunch on Sunday" and that a likely location is "Napa."

Figure 6B:
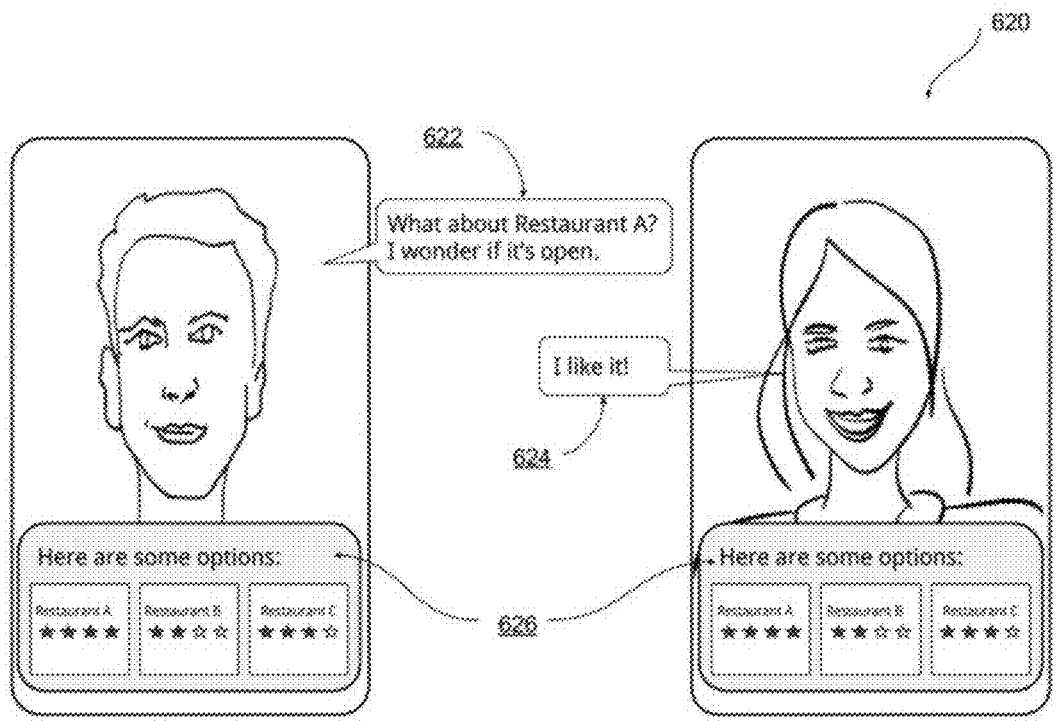
FIG. 6B is a diagrammatic illustration of an example user interface 620, according to some implementations.

FIG. 6B is a diagrammatic illustration of an example user interface 620, according to some implementations. Continuing the example illustrated in FIG. 6A, user interface displayed on each of devices 602 and 604 is updated based on the conversation context to display information item 626 that includes restaurant options for brunch in Napa, e.g., "Restaurant A," "Restaurant B," and "Restaurant C." Further, additional user information that is useful in the conversation context, e.g., star-ratings, is also included. The user of device 604 responds to the user of device 602 with phrase 622 "What about restaurant A? I wonder if it's open" In response and the user of device 602 responds with phrase 624 "I like it!" It is determined that additional conversation context is provided by this subsequent interaction. For example, the additional context is the query "is restaurant A open?" based on phrases 622 and 624.

Figure 6C:
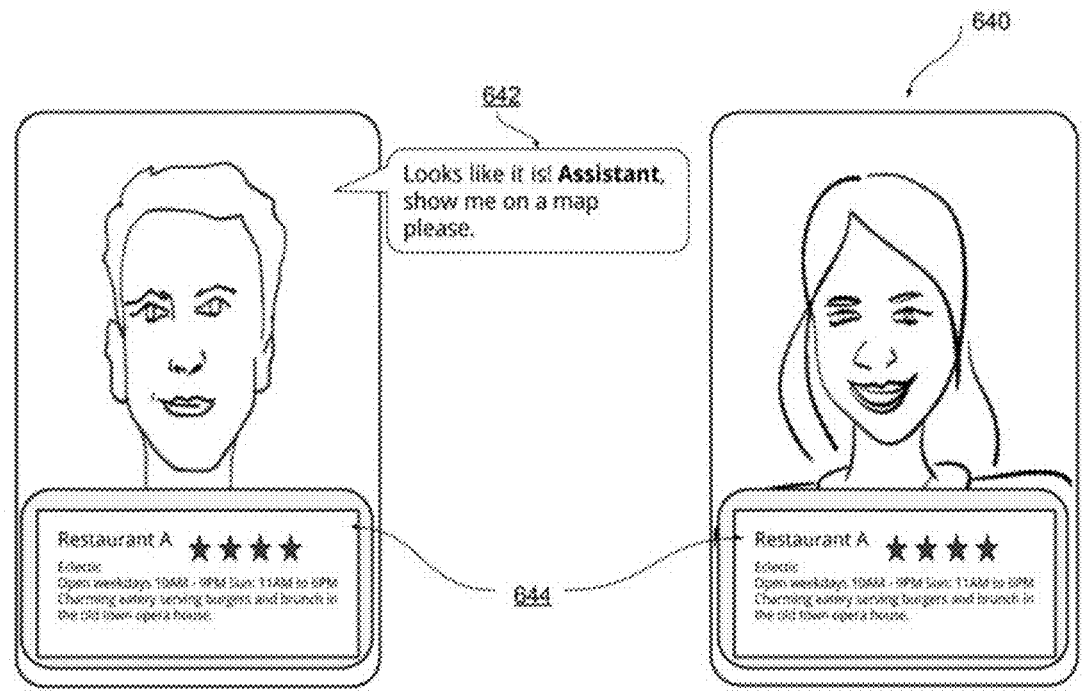
FIG. 6C is a diagrammatic illustration of an example user interface 640, according to some implementations.

FIG. 6C is a diagrammatic illustration of an example user interface 640, according to some implementations. Continuing the example illustrated in FIG. 6B, user interface displayed on each of devices 602 and 604 is updated based on the conversation context to display information item 644 that includes detailed information about restaurant A, including the hours when restaurant A is open, cuisine type, a brief description of the ambience at restaurant A, etc. The user of device 604 responds with phrase 642 "Looks like it is! Assistant, show me on a map please." The conversation context is further updated based on phrase 642. Further, it is detected that the user of device 604 made an explicit invocation for assistance.

Figure 6D:
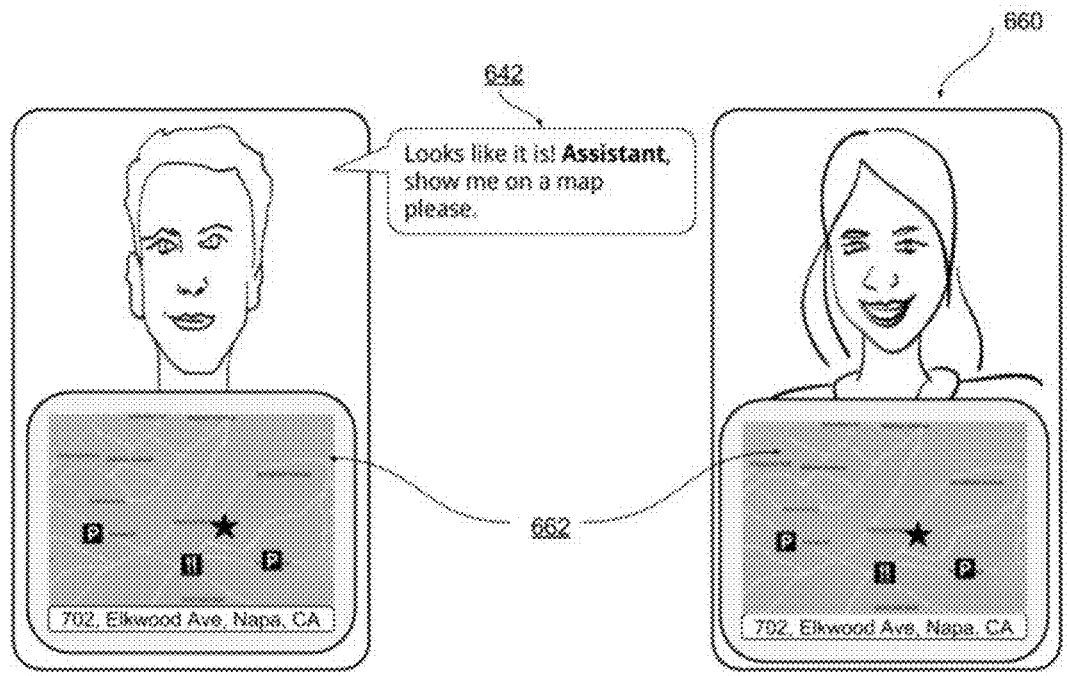
FIG. 6D is a diagrammatic illustration of an example user interface 660, according to some implementations.

FIG. 6D is a diagrammatic illustration of an example user interface 660, according to some implementations. Continuing the example illustrated in FIG. 6C, user interface displayed on each of devices 602 and 604 is updated based on the conversation context to display information item 662 that includes a map showing the location of restaurant A. In the example illustrated in FIG. 6D, it is further determined that display of information item 662 occupies a larger area and that a face of the users engaged in the communication session may be obscured due to overlay of information item 662. As illustrated in FIG. 6D, faces of the users are displayed closer to the top of the screen of each of devices 602 and 604, and the faces are reduced in size, e.g., from full-screen display of FIGS. 6A-6C, to a partial screen display of FIG. 6D.

As illustrated in FIGS. 6A-6D, as conversation in the communication session progresses, context is updated. Based on determined context and user interaction, various information items are identified and displayed in the communication session. Further, assistance may be provided based on implicit invocation and/or explicit invocation.

While FIGS. 5 and 6 illustrate a visual user interface provided by an assistant application, in some implementations, the assistant application may provide assistance in audio or video form. For example, upon determining that the conversation in a communication session includes a user query, e.g., "distance to restaurant A," the assistant application may provide the answer in audio form, e.g., "restaurant A is five miles away" in addition to or alternatively to providing this information item in visual form. In some implementations, e.g., when the communication session is an audio-only session, when one or more of computing devices in the session are not equipped with a screen (or are configured with the screen turned off), the assistant application may provide the answer in audio format. In some implementations, users may be provided with options to indicate a preferred format, e.g., visual or audio, for information items. In some implementations, an assistant application may provide the information item on an alternative device, e.g. for example when the user participates in the conversation on a device without a screen or with limited screen space, the information item may be displayed on the user's smartphone or tablet screen, e.g., on a smartphone or tablet that is linked with the user account that participates in the conversation.

In some implementations, assistant applications can be customized for participant users, e.g., based on the user's context, user's voice or speech patterns, etc. For example, the assistant application may detect that the user is participating in the communication session via a home speaker device that is not equipped with a screen, and based on this determination, provide information items in audio format. In some implementations, the assistant application may determine that the user is participating in the communication session from a public location, and in response, the assistant application may provide information items in a user interface displayed on a screen and turn off audio assistance. In some implementations, the assistant application may learn over time, e.g., if users permit the assistant application to learn user preferences from user activity in communication sessions, the assistant application can customize assistance features over time.

In some implementations, the assistant application may be customized based on user preferences, e.g., a user may indicate that she prefers to receive assistance during communication sessions with specific other users, and no assistance in communication sessions with other participants. In some implementations, the user may indicate a preference that the assistant application provide assistance for specific contexts, e.g., note taking, translation, etc. and/or not provide assistance for specific contexts, e.g., conversations about photos. In these implementations, the assistant application may provide assistance based on indicated user preferences. In some implementations, when users permit use of additional context information such as location, the assistant application may be customized based on such additional context information. For example, the assistant application may more likely provide a suggestion to take notes based on a determination that the user is at work, a location associated with notetaking, and provide the suggestion with a lower likelihood, e.g., when the user is at a non-work location.

In some implementations, an assistant application may provide additional assistance features. For example, in response to a user command, the assistant application may record and/or transcribe spoken conversation in a communication session, e.g., to facilitate later retrieval. For example, the assistant application may be invoked in a meeting held via audio or video conferencing to take meeting notes, to display meeting agenda, to record action items post-meeting, etc.

In some implementations, an assistant application may provide assistance features specific to a communication session. For example, the assistant application may be usable by participant users to control settings during the communication session, e.g., "mute audio," "turn off camera," "switch to back-facing camera," etc. In some implementations, assistant application may add users to a communication session, e.g., when a participant user indicates "add Dad to the call." In some implementations, assistant application may recognize multiple users that participate in the communication session from the same computing device, e.g., a videoconferencing system, a television set, etc. and provide assistance features based on determination that there are multiple users present. In some implementations, the assistant application may disable user interface features, e.g., prompts to approve sharing certain photos, at the computing device. In some implementations, the assistant application may provide user interface features, e.g., prompts to approve sharing certain photos, at alternate computing devices that are associated with a user account for a user that is a participant in the conversation from a device where multiple users are recognized as participating in a communication session.

In some implementations, assistant applications may perform visual recognition, e.g., based on video exchanged during a communication session, and provide information items. For example, a participant user may provide video from a camera of their computing device. The assistant application may detect that the video includes a recognized object, e.g., a monument, a book, a media item, etc., and display a user interface that provides information or actions associated with the recognized object. For example, the user interface may provide information about a monument and permit the participant users add the monument in personal or shared lists of destinations to visit. In another example, the user interface may provide information about a book recognized from the video, and the user interface may provide options for participant users to purchase the book, to add the book to a wishlist, etc.

In some implementations, the user interface may include information items personalized for each user. For example, when the assistant application displays a map showing restaurant A, the assistant application may include directions to the restaurant from a respective location of each participant user in the communication session. In another example, e.g., when the assistant application assists users in scheduling a meeting, the assistant application may display the meeting time in local time at the location each participant user. In some implementations, information items may be customized based on user preferences, e.g., ingredient quantities in a recipe may be displayed in units preferred by a user, e.g., in grams or ounces.

Assistant applications as described herein may provide information items concurrently to a plurality of participant users in a communication session. Users may interact with the information items, with the interaction being mirrored on the user interfaces for other participant users. In some implementations, the assistant application may be invoked by any user in a communication session. In some implementations, the assistant application may determine conversation context based on a flow of conversation and/or gestures in media content in the communication session, e.g., the conversation context may be determined based on speech or video received from two or more users in the communication session.

FIG. 7 is a diagrammatic illustration of an example user interface 700, according to some implementations. A plurality of conversation context phrases, e.g., phrases 702, 706, and 710 are illustrated, along with corresponding information items 704, 708, and 712 that were provided in a communication session. For example, phrase 702 may be spoken before phrase 706 and 710. User interface 700 presents a scrollable summary of conversation context and information items provided during a communication session in stacked form. A user may scroll, e.g., upwards or downwards, to view earlier contexts and/or information items. In some implementations, a user can access the scrollable summary during the communication session, e.g., by selecting a user interface element. In some implementations, the scrollable summary may be provided after the communication session has been terminated. In some implementations, the scrollable summary may include one or more reminders, e.g., based on the assistant application identifying action items discussed during the communication session.

FIG. 8 is a diagrammatic illustration of an example user interface 800, according to some implementations. In the example illustrated in FIG. 8, a multi-party communication session is in progress. Users 810, 812, and 814 are participants in the communication session. User interface 800 may be shown on a computing device, e.g., a computing device of users 810, 812, and 814. Users 810, 812, and 814 are engaged in a group activity in the communication session, mediated by an assistant application (or assistant program).

In the example illustrated in FIG. 8, the group activity is a quiz. In different implementations, the group activity can be any type of activity, e.g., viewing media, editing a document, etc. It is determined that the conversation context is a quiz, and in response, video of each user is displayed in a small size in the user interface 800. User interface 800 includes information items for the quiz, e.g., an image 802 and a question 806 associated with the image. In this example, the user "Player 3" has provided an answer 806, "Machu Picchu" to the quiz question. The assistant application may determine that Player 3 has provided the answer, and in response, update a score of Player 3 in the quiz. Further, the assistant application may bring up a next question in the quiz. In this manner, an assistant application may be invoked in a communication session to provide or enhance multi-party user interaction.

In some implementations, a visual representation of the assistant application may be included in user interface 800. In some implementations, in addition to or alternatively to providing display of user interface 800, assistant application may also provide audio to participants of the communication session. For example, question 804 may be read aloud and provided as audio in the communication session.

In some implementations, when users provide permission, the assistant application may record video and/or audio during the quiz, and replay the video, e.g., when a participant user answers a quiz question correctly. In some implementations, the assistant application may utilize media content, e.g., video, from the communication session in the quiz, e.g., to recognize a user that raised their hand first, to provide the quiz application. In some implementations, gesture recognition techniques may be used for such features. Gesture recognition may also be used for other features, e.g., to conduct a poll in a multi participant communication session.

Figure 9:
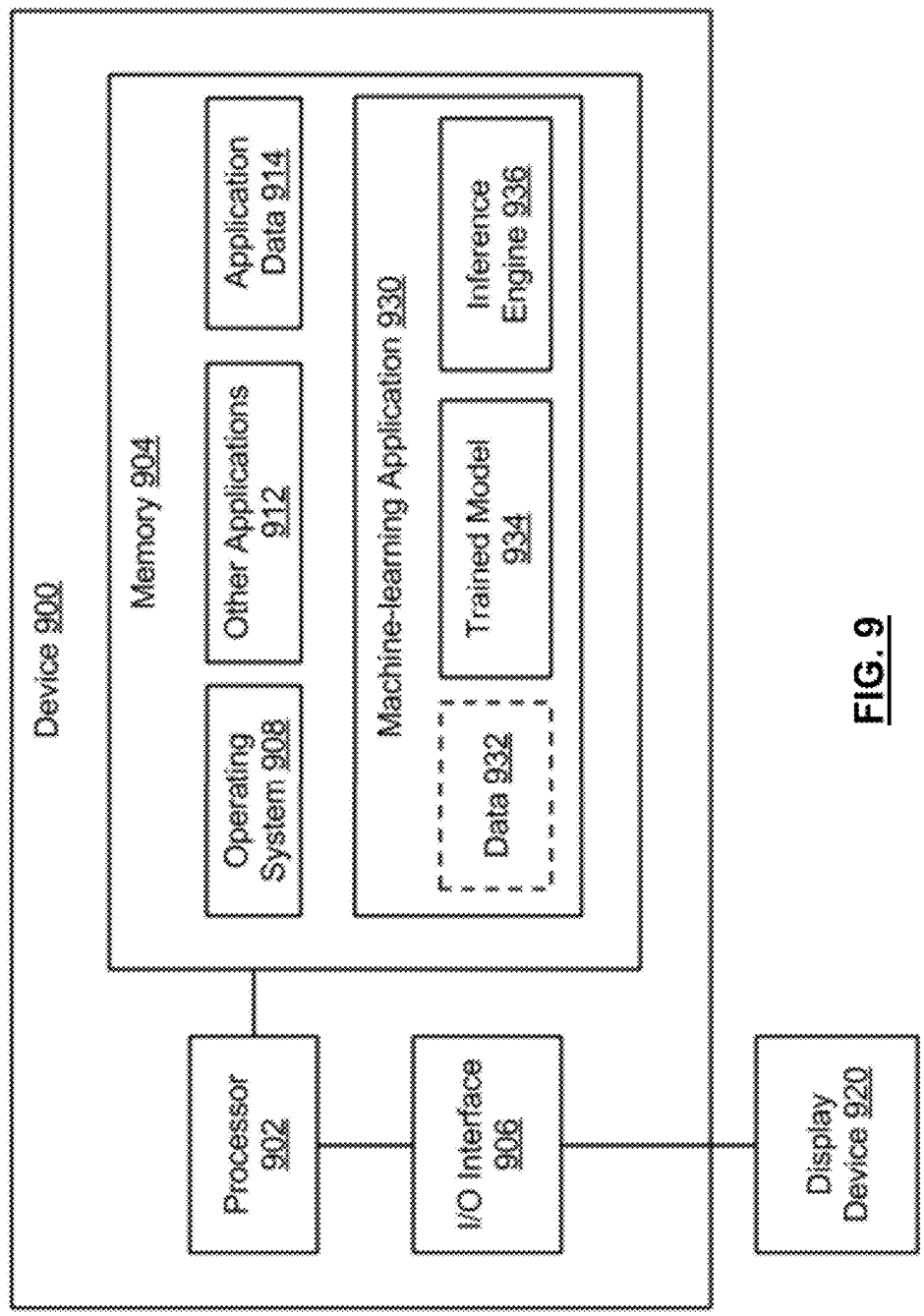
FIG. 9 is a block diagram of an example device which may be used for one or more implementations described herein.

FIG. 9 is a block diagram of an example device 900 which may be used to implement one or more features described herein. In one example, device 900 may be used to implement a client device, e.g., any of client devices 120-126 shown in FIG. 1. Alternatively, device 900 can implement a server device, e.g., server device 104, server device 142, etc. In some implementations, device 900 may be used to implement a client device, a server device, or both client and server devices. Device 900 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 900 includes a processor 902, a memory 904, and input/output (I/O) interface 906. Processor 902 can be one or more processors and/or processing circuits to execute program code and control basic operations of the device 900. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 902 may include one or more co-processors that implement neural-network processing. In some implementations, processor 902 may be a processor that processes data to produce probabilistic output, e.g., the output produced by processor 902 may be imprecise or may be accurate within a range from an expected output. Processing need not be limited to a particular geographic location, or have temporal limitations.

For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, machine-learning application 930, other applications 912, and application data 914. Other applications 912 may include applications such as a data display engine, web hosting engine, image display engine, notification engine, social networking engine, etc. In some implementations, the machine-learning application 930 and other applications 912 can each include instructions that enable processor 902 to perform functions described herein, e.g., some or all of the methods of FIGS. 3, and 4.

Other applications 912 can include, e.g., image editing applications, media display applications, communication applications, assistant applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 930 may utilize Bayesian classifiers, support vector machines, neural networks, or other learning techniques. In some implementations, machine-learning application 930 may include a trained model 934, an inference engine 936, and data 932. In some implementations, data 932 may include training data, e.g., data used to generate trained model 934. For example, training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 934, training data may include such user data. In implementations where users permit use of their respective user data, data 932 may include permitted data such as images (e.g., photos or other user-generated images), communications (e.g., e-mail; chat data such as text messages, voice, video, etc.), documents (e.g., spreadsheets, text documents, presentations, etc.)

In some implementations, data 932 may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 930 excludes data 932. For example, in these implementations, the trained model 934 may be generated, e.g., on a different device, and be provided as part of machine-learning application 930. In various implementations, the trained model 934 may be provided as a data file that includes a model structure or form, and associated weights. Inference engine 936 may read the data file for trained model 934 and implement a neural network with node connectivity, layers, and weights based on the model structure or form specified in trained model 934.

Machine-learning application 930 also includes a trained model 934. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 932 or application data 914. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, trained model 934 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 934 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 932, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by machine-learning application 930. In various implementations, a trained model includes a set of weights, or embeddings, corresponding to the model structure. In implementations where data 932 is omitted, machine-learning application 930 may include trained model 934 that is based on prior training, e.g., by a developer of the machine-learning application 930, by a third-party, etc. In some implementations, trained model 934 may include a set of weights that are fixed, e.g., downloaded from a server that provides the weights.

Machine-learning application 930 also includes an inference engine 936. Inference engine 936 is configured to apply the trained model 934 to data, such as application data 914, to provide an inference. In some implementations, inference engine 936 may include software code to be executed by processor 902. In some implementations, inference engine 936 may specify circuit configuration (e.g., for a programmable processor, for a field programmable gate array (FPGA), etc.) enabling processor 902 to apply the trained model. In some implementations, inference engine 936 may include software instructions, hardware instructions, or a combination. In some implementations, inference engine 936 may offer an application programming interface (API) that can be used by operating system 908 and/or other applications 912 to invoke inference engine 936, e.g., to apply trained model 934 to application data 914 to generate an inference.

Machine-learning application 930 may provide several technical advantages. For example, when trained model 934 is generated based on unsupervised learning, trained model 934 can be applied by inference engine 936 to produce knowledge representations (e.g., numeric representations) from input data, e.g., application data 914. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine 936.

In some implementations, knowledge representations generated by machine-learning application 930 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 930 may be implemented in an offline manner. In these implementations, trained model 934 may be generated in a first stage, and provided as part of machine-learning application 930. In some implementations, machine-learning application 930 may be implemented in an online manner. For example, in such implementations, an application that invokes machine-learning application 930 (e.g., operating system 908, one or more of other applications 912) may utilize an inference produced by machine-learning application 930, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 934, e.g., to update embeddings for trained model 934.

In some implementations, machine-learning application 930 may be implemented in a manner that can adapt to particular configuration of device 900 on which the machine-learning application 930 is executed. For example, machine-learning application 930 may determine a computational graph that utilizes available computational resources, e.g., processor 902. For example, if machine-learning application 930 is implemented as a distributed application on multiple devices, machine-learning application 930 may determine computations to be carried out on individual devices in a manner that optimizes computation. In another example, machine-learning application 930 may determine that processor 902 includes a GPU with a particular number of GPU cores (e.g., 1000) and implement the inference engine accordingly (e.g., as 1000 individual processes or threads).

In some implementations, machine-learning application 930 may implement an ensemble of trained models. For example, trained model 934 may include a plurality of trained models that are each applicable to same input data. In these implementations, machine-learning application 930 may choose a particular trained model, e.g., based on available computational resources, success rate with prior inferences, etc. In some implementations, machine-learning application 930 may execute inference engine 936 such that a plurality of trained models is applied. In these implementations, machine-learning application 930 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 908 or one or more applications 912.

In different implementations, machine-learning application 930 can produce different types of outputs. For example, machine-learning application 930 can provide representations or clusters (e.g., numeric representations of input data), labels (e.g., for input data that includes images, documents, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video, machine-learning application 930 may produce an output video with a particular effect applied, e.g., rendered in a comic-book or particular artist's style, when trained model 934 is trained using training data from the comic book or particular artist, etc. In some implementations, machine-learning application 930 may produce an output based on a format specified by an invoking application, e.g. operating system 908 or one or more applications 912. In some implementations, an invoking application may be another machine-learning application. For example, such configurations may be used in generative adversarial networks, where an invoking machine-learning application is trained using output from machine-learning application 930 and vice-versa.

Any of software in memory 904 can alternatively be stored on any other suitable storage location or computer-readable medium. In addition, memory 904 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. Interfaced devices can be included as part of the device 900 or can be separate and communicate with the device 900. For example, network communication devices, storage devices (e.g., memory and/or database 106), and input/output devices can communicate via I/O interface 906. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 906 can include one or more display devices 920 that can be used to display content, e.g., images, video, and/or a user interface of an output application as described herein. Display device 920 can be connected to device 900 via local connections (e.g., display bus) and/or via networked connections and can be any suitable display device. Display device 920 can include any suitable display device such as an LCD, LED, or plasma display screen, CRT, television, monitor, touchscreen, 3-D display screen, or other visual display device. For example, display device 920 can be a flat display screen provided on a mobile device, multiple display screens provided in a goggles or headset device, or a monitor screen for a computer device.

The I/O interface 906 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 9 shows one block for each of processor 902, memory 904, I/O interface 906, and software blocks 908, 912, and 930. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While some components are described as performing blocks and operations as described in some implementations herein, any suitable component or combination of components of environment 100, device 900, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
receiving session video content during a video communication session between a first computing device and a second computing device;
detecting, in the session video content, a gesture performed by a user associated with the first computing device;
determining, with a trained machine-learning model and based on the gesture, that the user invoked a request for assistance, wherein the request comprises a request for media and wherein the trained machine-learning model outputs a confidence score associated with the determination;
in response to the confidence score meeting a threshold, outputting, by the trained machine-learning model, the media; and
sending a first command to at least one of the first computing device or the second computing device to display the media.

2. The method of claim 1, wherein the first command causes the at least one of the first computing device or the second computing device to display the media in a user interface as an illustration that is overlaid atop the session video content.

3. The method of claim 2, further comprising:
determining, with the trained machine-learning model, an emotion associated with the user during the video communication session;
wherein the illustration is selected based on the gesture and the emotion associated with the user during the video communication session.

4. The method of claim 2, wherein the illustration is selected from a group of a heart, a birthday-related graphic, a trophy, and combinations thereof.

5. The method of claim 1, further comprising:
performing speech-to-text translation of audio associated with the user using the video communication session to obtain text;
wherein determining that the user associated with the first computing device invoked the request for media is further based on the text.

6. The method of claim 1, wherein the trained machine-learning model is personalized to the user by:
modifying one or more parameters of a pre-trained machine-learning model based on the user to obtain the trained machine-learning model.

7. The method of claim 1, wherein determining that the user associated with the first computing device invoked the request for media is further based on at least one detection selected from a group of face detection, motion detection, and combinations thereof.

8. A computing device comprising:
a processor; and
a memory coupled to the processor, with instructions stored thereon that, when executed by the processor, cause the processor to perform operations comprising:
receiving session video content during a video communication session between a first computing device and a second computing device;
detecting, in the session video content, a gesture performed by a user associated with the first computing device;
determining, with a trained machine-learning model and based on the gesture, that the user invoked a request for assistance, wherein the request comprises a request for media and wherein the trained machine-learning model outputs a confidence score associated with the determination;
in response to the confidence score meeting a threshold, outputting, by the trained machine-learning model, the media; and
sending a first command to at least one of the first computing device or the second computing device to display the media.

9. The computing device of claim 8, wherein the first command causes the at least one of the first computing device or the second computing device to display the requested media in a user interface as an illustration that is overlaid atop the session video content.

10. The computing device of claim 9, wherein the operations further include:
determining, with the trained machine-learning model, an emotion associated with the user during the video communication session;
wherein the illustration is selected based on the gesture and the emotion associated with the user during the video communication session.

11. The computing device of claim 9, wherein the illustration is selected from a group of a heart, a birthday-related graphic, a trophy, and combinations thereof.

12. The computing device of claim 8, wherein the operations further include:
performing speech-to-text translation of audio associated with the user using the video communication session to obtain text;
wherein determining that the user associated with the first computing device invoked the request for media is further based on the text.

13. The computing device of claim 8, wherein the trained machine-learning model is personalized to the user by:
modifying one or more parameters of a pre-trained machine-learning model based on the user to obtain the trained machine-learning model.

14. The computing device of claim 8, wherein determining that the user associated with the first computing device invoked the request for media is further based on at least one detection selected from a group of face detection, motion detection, and combinations thereof.

15. A non-transitory computer-readable medium with instructions stored thereon that, when executed by one or more computers, cause the one or more computers to perform operations, the operations comprising:
receiving session video content during a video communication session between a first computing device and a second computing device;

detecting, in the session video content, a gesture performed by a user associated with the first computing device;

determining, with a trained machine-learning model and based on the gesture, that the user invoked a request for assistance, wherein the request comprises a request for media and wherein the trained machine-learning model outputs a confidence score associated with the determination;

in response to the confidence score meeting a threshold, outputting, by the trained machine-learning model, the media; and sending a first command to at least one of the first computing device or the second computing device to display the media.

16. The non-transitory computer-readable medium of claim 15, wherein the first command causes the at least one of the first computing device or the second computing device to display the requested media in a user interface as an illustration that is overlaid atop the session video content.

17. The non-transitory computer-readable medium of claim 16, wherein the operations further include:

determining, with the trained machine-learning model, an emotion associated with the user during the video communication session;

wherein the illustration is selected based on the gesture and the emotion associated with the user during the video communication session.

18. The non-transitory computer-readable medium of claim 16, wherein the illustration is selected from a group of a heart, a birthday-related graphic, a trophy, and combinations thereof.

19. The non-transitory computer-readable medium of claim 15, wherein the operations further include:

performing speech-to-text translation of audio associated with the user using the video communication session to obtain text;

wherein determining that the user associated with the first computing device invoked the request for media is further based on the text.

20. The non-transitory computer-readable medium of claim 15, wherein the trained machine-learning model is personalized to the user by:

modifying one or more parameters of a pre-trained machine-learning model based on the user to obtain the trained machine-learning model.

* * * * *